United States Patent
Talebi Fard et al.

(10) Patent No.: US 11,477,693 B2
(45) Date of Patent: *Oct. 18, 2022

(54) ESTABLISHING A SESSION WITH A USER PLANE FUNCTION SUPPORTING UPLINK CLASSIFIER FUNCTIONALITY

(71) Applicant: Ofinno, LLC, Reston, VA (US)

(72) Inventors: Peyman Talebi Fard, Sterling, VA (US); Esmael Dinan, McLean, VA (US); Kyungmin Park, Herndon, VA (US); Weihua Qiao, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/091,769

(22) Filed: Nov. 6, 2020

(65) Prior Publication Data
US 2021/0058990 A1    Feb. 25, 2021

Related U.S. Application Data

(63) Continuation of application No. 16/216,136, filed on Dec. 11, 2018, now Pat. No. 10,834,636.

(60) Provisional application No. 62/615,903, filed on Jan. 10, 2018.

(51) Int. Cl.
| | |
|---|---|
| *H04W 28/06* | (2009.01) |
| *H04W 40/02* | (2009.01) |
| *H04W 76/10* | (2018.01) |
| *H04L 43/028* | (2022.01) |
| *H04W 76/12* | (2018.01) |
| *H04W 48/16* | (2009.01) |

(Continued)

(52) U.S. Cl.
CPC ......... *H04W 28/065* (2013.01); *H04L 43/028* (2013.01); *H04W 40/02* (2013.01); *H04W 48/16* (2013.01); *H04W 76/10* (2018.02); *H04W 76/12* (2018.02); *H04L 61/5014* (2022.05); *H04L 2101/659* (2022.05)

(58) Field of Classification Search
CPC ... H04W 28/065; H04W 76/12; H04W 76/10; H04W 40/02; H04W 48/16; H04L 43/028; H04L 61/6059; H04L 61/2015
See application file for complete search history.

(56) References Cited

U.S. PATENT DOCUMENTS

2018/0270782 A1    9/2018   Park et al.

OTHER PUBLICATIONS

3GPP TS 23.214 V15.0.0 (Sep. 2017); Technical Specification; 3rd Generation Partnership Project; Technical Specification Group Services and System Aspects; Architecture enhancements for control and user plane separation of EPC nodes; Stage 2.

(Continued)

*Primary Examiner* — Natasha W Cosme
(74) *Attorney, Agent, or Firm* — Philip R. Smith; Kavon Nasabzadeh; Sachin Kandhari

(57) ABSTRACT

A session management function sends, to a network repository function, a first message requesting discovery of a user plane function supporting an uplink classifier functionality for a packet data unit session of a wireless device. The first message comprises an uplink classifier indication parameter. based on the first message, a second message comprising an identifier of the user plane function is received from the network repository function. A third message requesting a connection for the wireless device, between the session management function and the user plane function, is sent to the user plane function.

20 Claims, 18 Drawing Sheets

(51) Int. Cl.
H04L 61/5014 (2022.01)
H04L 101/659 (2022.01)

(56) References Cited

OTHER PUBLICATIONS

3GPP TS 23.501 V2.0.1 (Dec. 2017); Technical Specification; 3rd Generation Partnership Project; Technical Specification Group Services and System Aspects; System Architecture for the 5G System; Stage 2; (Release 15).
3GPP TS 23.502 V2.0.0 (Dec. 2017); Technical Specification; 3rd Generation Partnership Project; Technical Specification Group Services and System Aspects; Procedures for the 5G System; Stage 2 (Release15).
3GPP TS 29.244 V14.1.0 (Sep. 2017); Technical Specification; 3rd Generation Partnership Project; Technical Specification Group Core Network and Terminals; Interface between the Control Plane and the User Plane of EPC Nodes; Stage 3 (Release 14).
3GPP TS 23.501 V1.6.0 (Dec. 2017); Technical Specification; 3rd Generation Partnership Project; Technical Specification Group Services and System Aspects; System Architecture for the 5G System; Stage 2; (Release 15).
SA WG2 Temporary Document; SA WG2 Meeting #115; S2-163005; May 23-27, 2016, Nanjing, P.R. China; Source: Nokia, Alcatel-Lucent Shanghai Bell, Ericsson, Huawei; Title: Solution for Session Continuity; Document for: Approval/Discussion; Agenda Item: 6.10.6.
S2-171465_0860-Insertion of UL CL or BP_v1; SA WG2 Meeting #119S2-1708601465 Feb. 13-17, 2017, Dubrovnik, Croatia(revision of S2-17xxxx); Source:Motorola Mobility, Lenovo; Title:Insertion /removal of UL CL or Branching point; Document for:Approval; Agenda Item:6.5.3.
S2-171866_TS 23.502 Procedures of insertion and removal of UL CL from PDU session; SA WG2 Meeting #120; Mar. 27-31, 2017, Busan, South Korea(revision of S2-17xxxx); Source:Huawei, Hisilicon; Title:TS 23.502: Procedures of insertion and removal of UL CL from PDU session; Document for:Approval; Agenda Item:6.5.3.
S2-172208_TS 23.502 procedures for UL-CL; SA WG2 Meeting #120; Mar. 27-31, 2017, Busan, Korea; Source:ZTE; Title:TS 23.502 Procedure on Inserting UL Classifier to PDU session ; Document for:Approval; Agenda Item:6.5.3.
S2-177414_TS 23.501 AccessTypeBasedSMF-UPF-Selection; SA WG2 Meeting #123; Oct. 23-27, 2017, Ljubljana, Slovenia; Source:NTT DOCOMO; Title:TS 23.501: OI#18: Update of SMF and UPF selection principle; Document for:Approval; Agenda Item:6.5.3.
S2-177543-501 NRF_for_UPF ; SA WG2 Meeting #123; Oct. 23-27, 2017, Ljubljana, SL (was S2-176496); ; Source:Nokia, Nokia Shanghai Bell; Title:23.501 §6.3.3: NRF for UPF; Document for:Approval.
S2-177565-PCR-OI#18 23501_Interaction between SMF and UPF_r3.7; SA WG2 Meeting #123; Oct. 23-27, 2017, Ljubljana, Slovenia(revision of S2-17xxxx); Source:Huawei, HiSilicon; Title:OI#18 TS 23.501: Interaction between SMF and UPF on N4 Reference Point; Document for:Discussion and Approval; Agenda Item:6.5.3.
S2-177566-PCR-23501_UPF selection_r2.2; SA WG2 Meeting #123; Oct. 23-27, 2017, Ljubljana, Slovenia(revision of S2-17xxxx); Source:Huawei, HiSilicon; Title:TS 23.501: UPF Selection based on SMF Local Information; Document for:Discussion and Approval; Agenda Item:6.5.3.
S2-177886 was 7129 TS23.502 Relocation of Additional PDU session anchor and Branching Point or UL CL; SA WG2 Meeting #123; Oct. 23-27, 2017, Ljubljana, Slovenia(revision of S2-177129); Source:Huawei, HiSilicon; Title: TS23.502 Relocation of Additional PDU Session Anchor and Branching Point or UL CL; Document for:Approval; Agenda Item:6.5.3.
S2-178028(was7884)_clarification_on_UL_CL_relocation; 3GPP TSG SA WG2 Meeting #123; Oct. 23-27, 2017, Ljubljana, Slovenia(revision of S2-177884); Source:Intel, ZTE, NTT DOCOMO, Samsung Title:Clarification on UL CL Relocation procedure; Document for:Approval; Agenda Item:6.5.3.
S2-178111 was 7821 7139 TS 23 501 clarification for multiple UL CLs r4; SA WG2 Meeting #123; Oct. 23-27, 2017, Ljubljana, Slovenia(revision of S2-177139,7821); ; Source: Huawei, Hisilicon; Title:TS 23.501 clarification for multiple UL CLs; Document for:Approval.
S2-178112 was S2-177822NRF UPF; SA WG2 Meeting #123; Oct. 23-27, 2017, Ljubljana, SL (was S2-177822); ; Source:Nokia, Nokia Shanghai Bell, cisco; Title:23.501 §6.3.3: NRF for UPF; Document for:Approval.
S2-178171 was8160 PCR-23501_UPF selection_r5; SA WG2 Meeting #123; Oct. 23-27, 2017, Ljubljana, Slovenia(revision of S2-178160); Source:Huawei, HiSilicon; Title:TS 23.501: UPF Selection based on SMF Local Information; Document for:Discussion and Approval; Agenda Item:6.5.3.
S2-178256—501NRF UPF-V3; SA WG2 Meeting #124; Nov. 27-Dec. 1, 2017, Reno, NV, USA(was S2-178112 was S2-178256); ; Source:Nokia, Nokia Shanghai Bell, Verizon, Cisco, Deutsche Telecom; Title:OI#19: 23.501 §6.3.3: NRF for UPF discovery; Document for:Approval.
S2-178509—502NRF UPF v1 ; SA WG2 Meeting #124; Nov. 27-Dec. 1, 2017, Reno, NV, USA(was S2-178509); ; Source:Nokia, Nokia Shanghai Bell, Verizon, Cisco, Deutsche Telecom; Title:OI#19: 23.502 §4.17.x: NRF for UPF discovery; Document for:Approval.
S2-178779—501 data for SMF selection of UPF ; SA WG2 Meeting #124S2-179779 Nov. 27-Dec. 1, 2017, Reno, NV, USA(was S2-178779); Source:Nokia, Nokia Shanghai Bell, ; Title:23.501/§ 6.3.3: location data SMF needs for UPF selection; Document for:Approval; Agenda Item:6.5.3.
S2-178922-PCR-23501_NW topo UPF selection_r1.3; SA WG2 Meeting #124; Nov. 27-Dec. 1, 2017, Reno, USA(revision of S2-17xxxx); Source:Huawei, HiSilicon; Title:OI#19 TS 23.501 Proposal on Using UPF Topology for UPF Selection by SMF; Document for:Discussion and Approval; Agenda Item:6.5.3.
S2-178924-PCR-23502_N4 node level procedure_r1.1; SA WG2 Meeting #124; Nov. 27-Dec. 1, 2017, Reno, USA(revision of S2-17xxxx); Source:Huawei, HiSilicon; Title:TS 23.502: Proposal of N4 node level procedures; Document for:Discussion and Approval; Agenda Item:6.5.3.
S2-179121 rev1; SA WG2 Meeting #S2-124;rev1 Nov. 27-Dec. 1, 2017, Reno, NV, USA(was S2-178293); Source:Samsung, Deutsche Telekom; Title:TS 23.502: Clarification on NF Service Discovery; Document for:Approval; Agenda Item:6.5.11.
S2-179325 was S2-178509—502NRF UPF rev4; SA WG2 Meeting #124; rev4 Nov. 27-Dec. 1, 2017, Reno, NV, USA(was S2-178509); ; Source:Nokia, Nokia Shanghai Bell, Verizon, Cisco, Deutsche Telecom; Title:OI#19: 23.502 §4.17.x: NRF for UPF discovery; Document for:Approval.
S2-179325 was S2-178509—502NRF UPF rev5; SA WG2 Meeting #124; rev5 Nov. 27-Dec. 1, 2017, Reno, NV, USA(was S2-178509); ; Source:Nokia, Nokia Shanghai Bell, Verizon, Cisco, Deutsche Telecom; Title:OI#19: 23.502 §4.17.x: NRF for UPF discovery; Document for:Approval.
S2-179352 was8924-PCR-23502_N4 node level procedure_r1.2; SA WG2 Meeting #124; Nov. 27-Dec. 1, 2017, Reno, USA(revision of 32-178924); Source:Huawei, HiSilicon; Title:TS 23.502: Proposal of N4 node level procedures; Document for:Discussion and Approval; Agenda Item:6.5.3.
SP-170743_S2-176655_SID-SMF area; SA WG2 Meeting #1223GPP TSG SA Meeting #77TD ; Sep. 13-15, 2017, Sapporo, Japan; SA WG2 Meeting #122bS2-176655; Aug. 21-25, 2017, Sophia Antipolis, FR(revision of S2-176013); Source:SA WG2; Title:New SID on Enhancing Topology of SMF and UPF in 5G Networks.

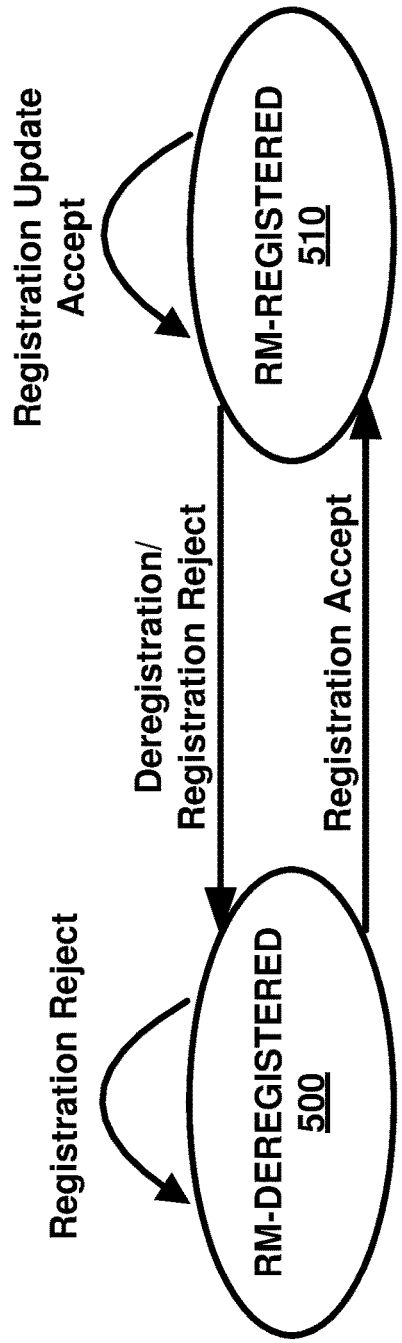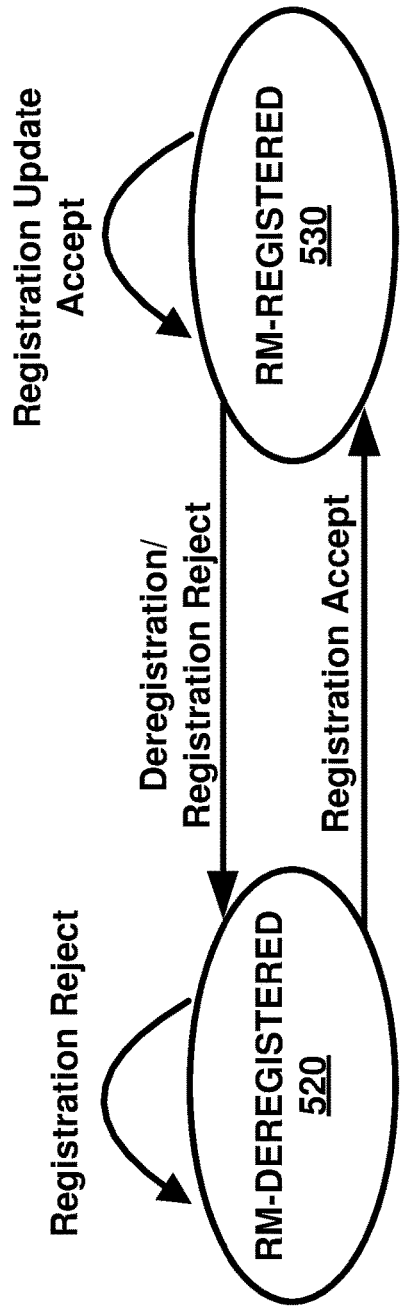
FIG. 5A
FIG. 5B

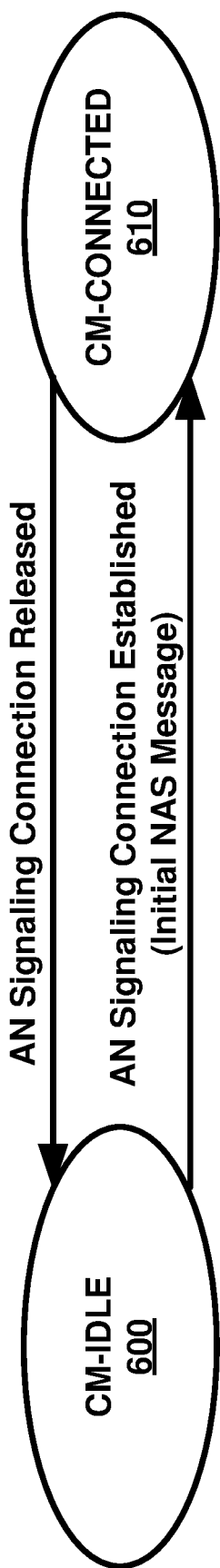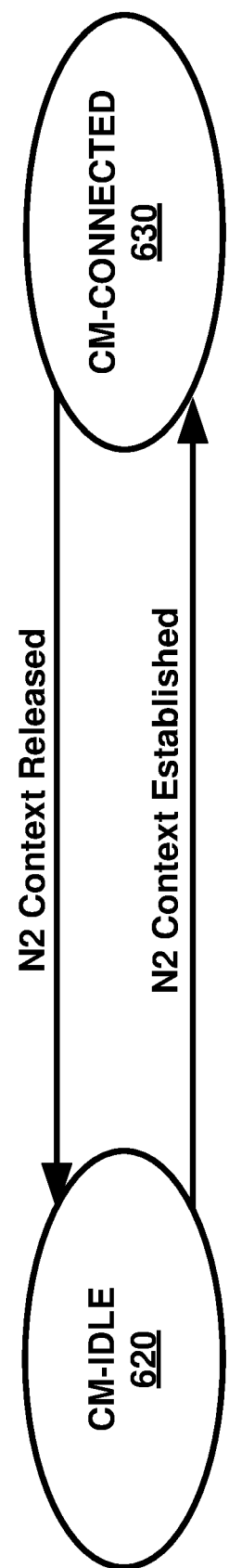

Receive, by a session management function from an access and mobility management function, a request for a packet data unit session for a wireless device
1610

Determine, by the session management function, that the packet data unit session for the wireless device requires a user plane function that supports an uplink classifier functionality
1620

Send, by the session management function to a network repository function and based on the determining, a first message requesting a discovery of the user plane function, the first message comprising an uplink classifier indication parameter
1630

Receive, by the session management function from the network repository function and based on the first message, a second message comprising an identifier of the user plane function
1640

Send, by the session management function to the user plane function, a third message requesting to establish a connection between the session management function and the user plane function
1650

FIG.16

Receive, by a network repository function from a user plane function, a first message indicating a registration request for the user plane function, the first message comprising an uplink classifier parameter indicating that the user plane function supports an uplink classifier functionality
1710

Receive, by the network repository function from a session management function, a second message indicating a request to discover a user plane function that supports the uplink classifier functionality
1720

Select, by the network repository function in response to receiving the second message, the user plane function based on the uplink classifier parameter
1730

Send, by the network repository function to the session management function, a third message comprising an identifier of the user plane function
1740

FIG.17

Determine, by a session management function that a packet data unit session of a wireless device requires a user plane function that supports an uplink classifier functionality
1810

Send, by the session management function to a network repository function and based on the determining, a first message requesting a discovery of the user plane function supporting the uplink classifier functionality
1820

Receive, by the session management function from the network repository function and based on the first message, a second message comprising an identifier of the user plane function
1830

Send, by the session management function to the user plane function, a third message requesting to establish a connection between the session management function and the user plane function
1840

FIG.18

ESTABLISHING A SESSION WITH A USER PLANE FUNCTION SUPPORTING UPLINK CLASSIFIER FUNCTIONALITY

CROSS-REFERENCE TO RELATED APPLICATIONS

This application is a continuation of U.S. patent application Ser. No. 16/216,136, filed Dec. 11, 2018, which claims the benefit of U.S. Provisional Application No. 62/615,903, filed Jan. 10, 2018, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict two registration management state models in UE 100 and AMF 155 as per an aspect of embodiments of the present disclosure.

FIG. 6A and FIG. 6B depict two connection management state models in UE 100 and AMF 155 as per an aspect of embodiments of the present disclosure.

FIG. 16 is a flow diagram of an aspect of an embodiment of the present disclosure.

FIG. 17 is a flow diagram of an aspect of an embodiment of the present disclosure.

FIG. 18 is a flow diagram of an aspect of an embodiment of the present disclosure.

DETAILED DESCRIPTION OF EMBODIMENTS

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
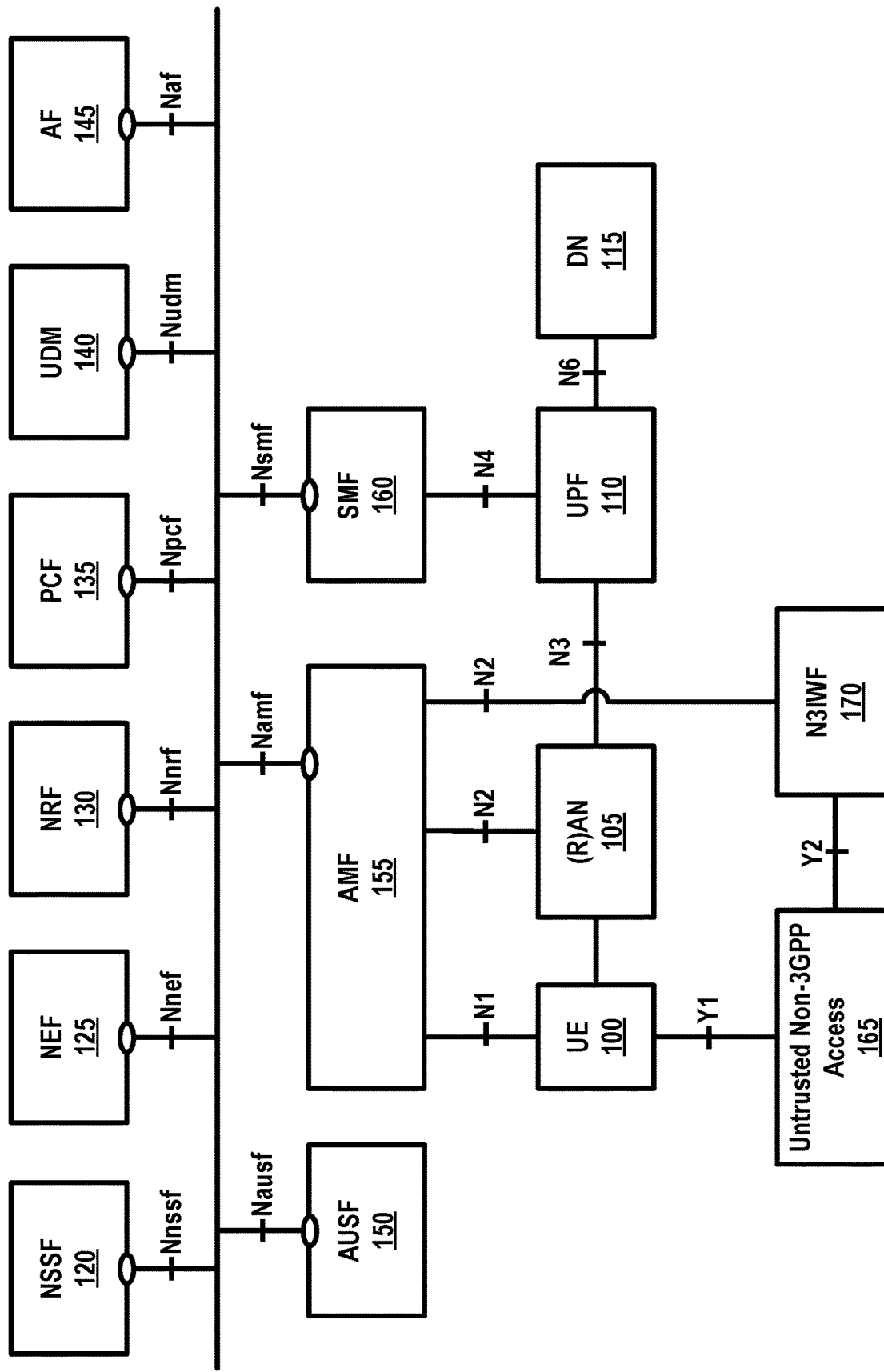
FIG. 1 is a diagram of an example 5G system architecture as per an aspect of an embodiment of the present disclosure.
Figure 2:
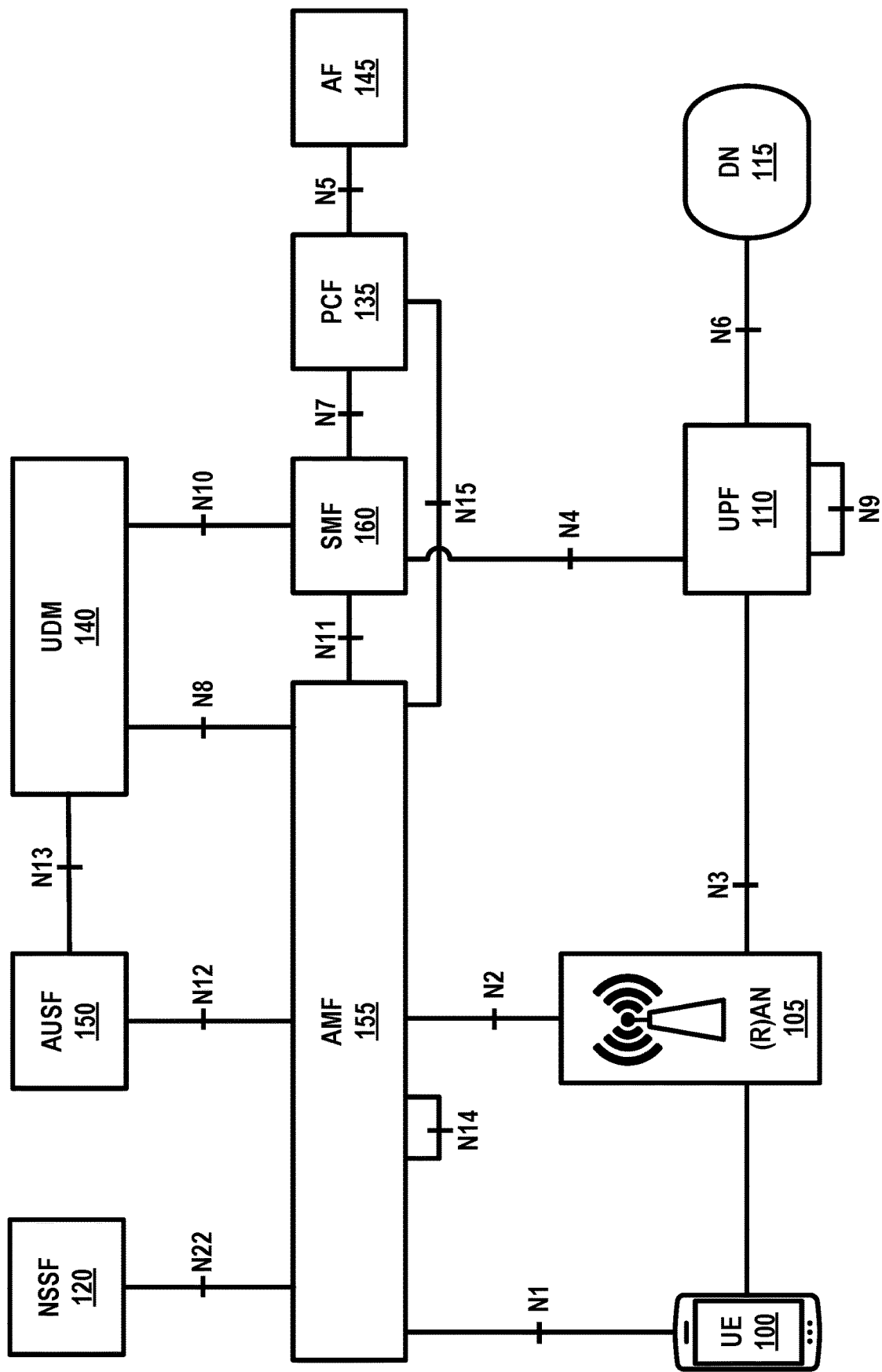
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
F-TEID Fully Qualified TEID
GPSI Generic Public Subscription Identifier
GTP GPRS Tunneling Protocol
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet Data Unit
PEI Permanent Equipment Identifier
PLMN Public Land Mobile Network
RAN Radio Access Network
QFI QoS Flow Identity
RM Registration Management
S1-AP S1 Application Protocol
SBA Service Based Architecture
SEA Security Anchor Function
SCM Security Context Management
SMF Session Management Function
SMSF SMS Function
S-NSSAI Single Network Slice Selection Assistance information
SUPI Subscriber Permanent Identifier
TEID Tunnel Endpoint Identifier
UE User Equipment UL Uplink
UL CL Uplink Classifier
UPF 110 User Plane Function Example FIG. 1 and FIG. 2 depict a 5G system comprising of access networks and 5G core network. An example 5G access network may comprise an access network connecting to a 5G core network. An access network may comprise a NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces are employed for communication among the functional elements and/or network elements.

Figure 3:
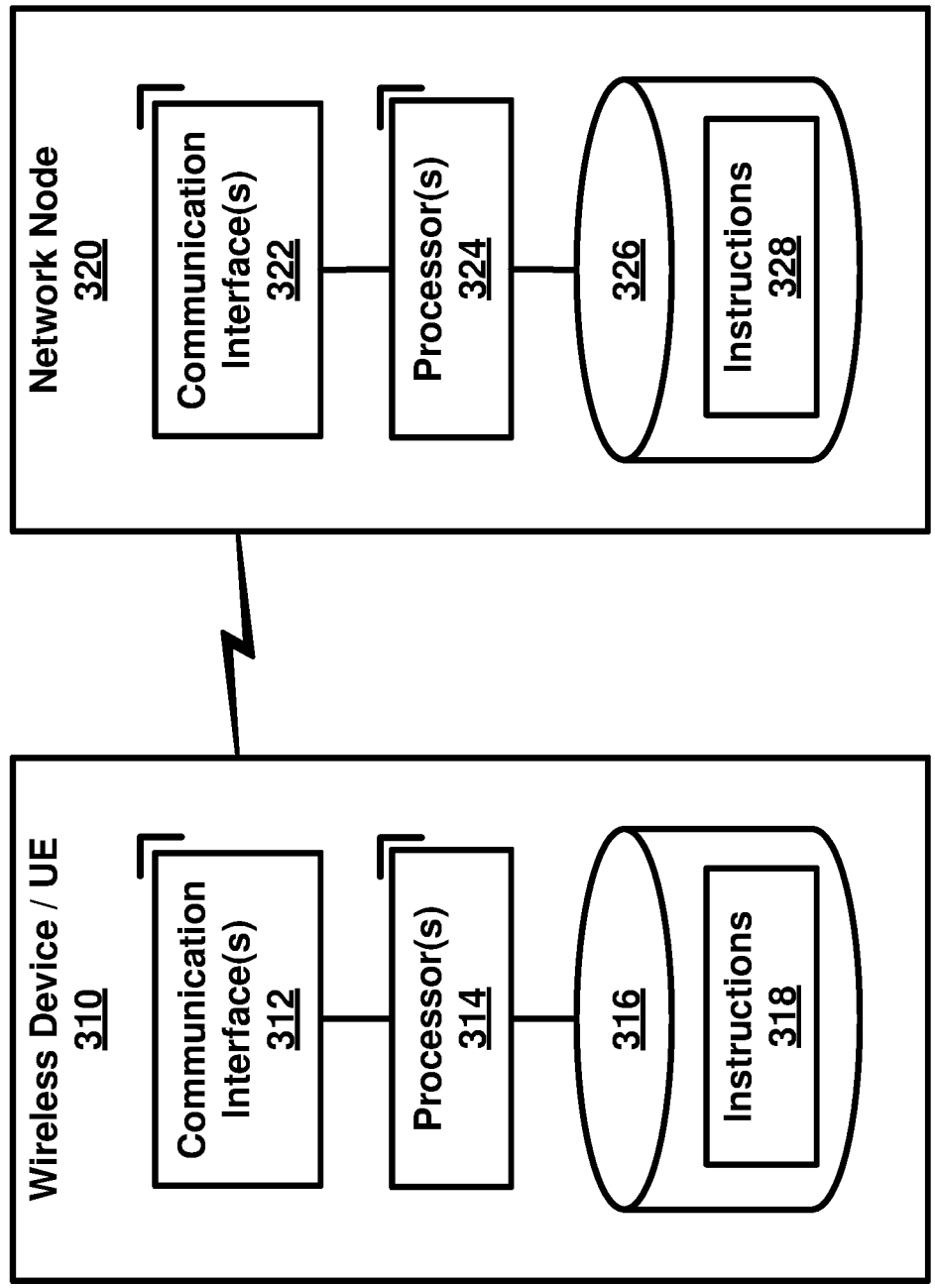
FIG. 3 is a system diagram of an example wireless device and a network node in a 5G system as per an aspect of an embodiment of the present disclosure.
Figure 4:
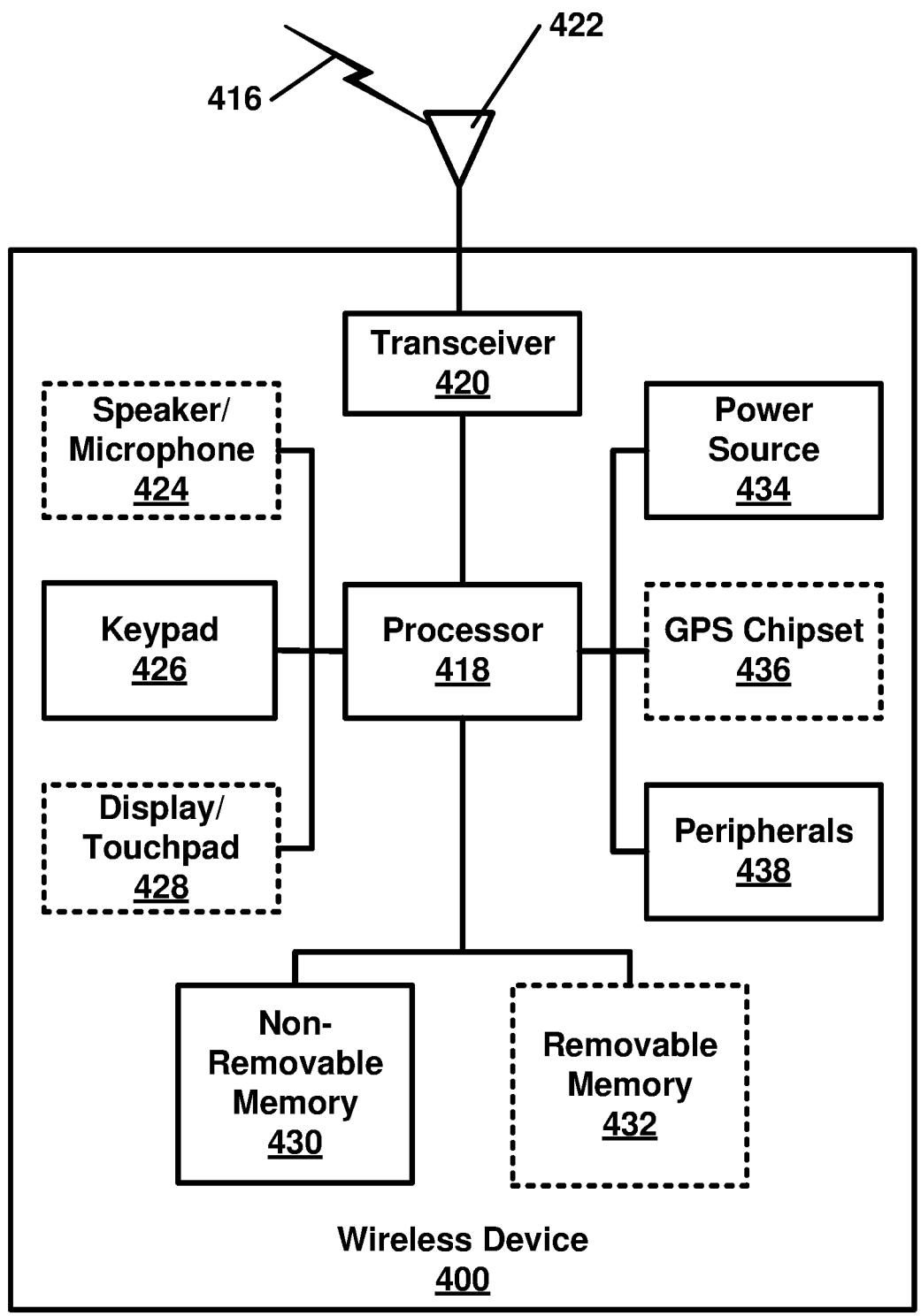
FIG. 4 is a system diagram of an example wireless device as per an aspect of an embodiment of the present disclosure.

A network function may be a processing function in a network, which has a functional behavior and interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

Access and mobility management function, AMF 155, may include the following functionalities (some of the AMF functionalities may be supported in a single instance of an AMF 155): termination of RAN CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys.

The AMF 100 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP and non-3GPP accesses 105, 165 simultaneously, support of a coordinated RM context valid over 3GPP and non 3GPP accesses 105, 165, support of CM management contexts for the UE 100 for connectivity over non-3GPP access. Some of functionalities described above may be supported in an instance of a network slice.

In an example, an AMF 155 region may comprise of one or multiple AMF 100 sets. AMF 155 set comprises of some AMFs 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that has been provisioned in a UE 100. DN 115 access identifier (DNAI), for a DNN, may be an identifier of a user plane access to a DN 115. Initial registration may be related to a UE 100 registration in RM-DEREGISTERED 500, 520 state. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

The session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115. One or more of functionalities described above may be required to be supported in an instance of a network slice.

The user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering and downlink data notification triggering. One or more of functionalities described above may be supported in an instance of a network slice.

The UE 100 IP address management may include allocation and release of the UE 100 IP address as well as renewal of the allocated IP address, where applicable. The UE 100 sets the requested PDU type during the PDU session establishment procedure based on its IP stack capabilities and configuration. In an example, the SMF 160 may select PDU type of a PDU session as follows: If the SMF 160 receives a request with PDU type set to IP, the SMF 160 may select either PDU type IPv4 or IPv6 based on DNN configuration and operator policies. A SMF 160 may also provide a cause value to the UE 100 to indicate whether the other IP version is supported on the DNN. If the other IP version is supported, UE 100 may request another PDU Session to the same DNN for the other IP version. If the SMF 160 receives a request for PDU type IPv4 or IPv6 and the requested IP version is supported by the DNN the SMF selects the requested PDU type.

In an example embodiment, the 5GC elements and UE 100 support the following mechanisms: during PDU session establishment procedure, the SMF 160 may send the IP address to the UE 100 via SM NAS signaling. The IPv4 address allocation and/or IPv4 parameter configuration via DHCPv4 may also be employed once PDU session is established. IPv6 prefix allocation may be supported via IPv6 stateless autoconfiguration, if IPv6 is supported. IPv6 parameter configuration via stateless DHCPv6 may also be supported.

The 5GC may support the allocation of a static IPv4 address and/or a static IPv6 prefix based on subscription information in the UDM 140 or based on the configuration on a per-subscriber, per-DNN basis.

User plane function(s) (UPF 110(*s*) 110) may handle the user plane path of PDU sessions. A UPF 110 that provides the interface to a data network supports the functionality of a PDU session anchor.

The policy control function, PCF 135, may support unified policy framework to govern network behavior, provide policy rules to control plane function(s) to enforce them, implement a front end to access subscription information relevant for policy decisions in a user data repository (UDR).

The network exposure function, NEF 125, may provide a means to securely expose the services and capabilities provided by the 3GPP network functions, translate between information exchanged with the AF 145 and information exchanged with the internal network functions, receive information from other network functions.

The NF repository function, NRF 130 may support service discovery function that receives NF discovery request from NF instance, provide the information of the discovered NF instances (be discovered) to the NF instance, and maintain the information of available NF instances and their supported services.

The unified data management, UDM 140, may comprise of the application front end (FE) that includes the UDM-FE that is in charge of processing credentials, location management, subscription management and the PCF 135 in charge of policy control; and the user data repository, UDR, that stores data required for functionalities provided by UDM-FE, plus policy profiles required by the PCF 135.

The NSSF may support selecting the set of network slice instances serving the UE 100, determining the Allowed NSSAI, determining the AMF 155 set to be employed to serve the UE 100, and/or, based on configuration, determining a list of candidate AMF(s) 155, possibly by querying the NRF 130.

The data stored in the UDR include at least user subscription data, including at least subscription identifiers, security credentials, access and mobility related subscription data and/or session related subscription data and/or policy data.

The AUSF 150 may support authentication server function (AUSF). The functionality of N3IWF 170 in case of untrusted non-3GPP access 165 may include at least one or more of the following: support of IPsec tunnel establishment with the UE; The N3IWF 170 may terminate the IKEv2/IPsec protocols with the UE 100 over NWu and may relay over N2 the information needed to authenticate the UE 100 and authorize its access to the 5G core network; Termination of N2 and N3 interfaces to 5G Core Network for Control-Plane and user-plane respectively; Relaying uplink and downlink control-plane NAS (N1) signaling between the UE 100 and AMF 155; Handling of N2 signaling from SMF 160 (relayed by AMF 155) related to PDU sessions and QoS; Establishment of IPsec Security Association (IPsec SA) to support PDU session traffic; Relaying uplink and downlink user-plane packets between the UE 100 and UPF 110; Enforcing QoS corresponding to N3 packet marking, considering QoS requirements associated to such marking received over N2; N3 user-plane packet marking in the uplink; and/or local mobility anchor within untrusted non-3GPP access networks 165 using MOBIKE; Supporting AMF 155 selection.

The application function, AF 145, may interact with the 3GPP core network to provide services. Based on operator deployment, application functions may be trusted by the operator to interact directly with relevant network functions. Application functions not allowed by the operator to access directly the network functions may use the external exposure framework (via the NEF 125) to interact with relevant network functions.

The control plane interface between the (R)AN 105 and the 5G core may support connection of multiple different kinds of AN(s) (e.g. 3GPP RAN 105, N3IWF 170 for Untrusted access 165) to the 5GC via a unique control plane protocol. A single N2 AP protocol may be employed for both the 3GPP access 105 and non-3GPP access 165; and decoupling between AMF 155 and other functions such as SMF 160 that may need to control the services supported by AN(s) (e.g. control of the UP resources in the AN 105 for a PDU session).

The 5GC may be able to provide policy information from the PCF 135 to the UE 100. Such policy information may include but not limited to the following: access network discovery & selection policy, UE 100 route selection policy (URSP) that groups to or more of SSC mode selection policy (SSCMSP), network slice selection policy (NSSP), DNN selection policy, and non-seamless offload policy.

The 5G core network may support the connectivity of a UE 100 via non-3GPP access networks 165. As shown in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

A UE 100 may need to register with the network to receive services that require registration. Once registered and if applicable the UE 100 may update its registration with the network periodically in order to remain reachable (periodic registration update); or upon mobility (mobility registration update); or to update its capabilities or re-negotiate protocol parameters.

Figure 8:
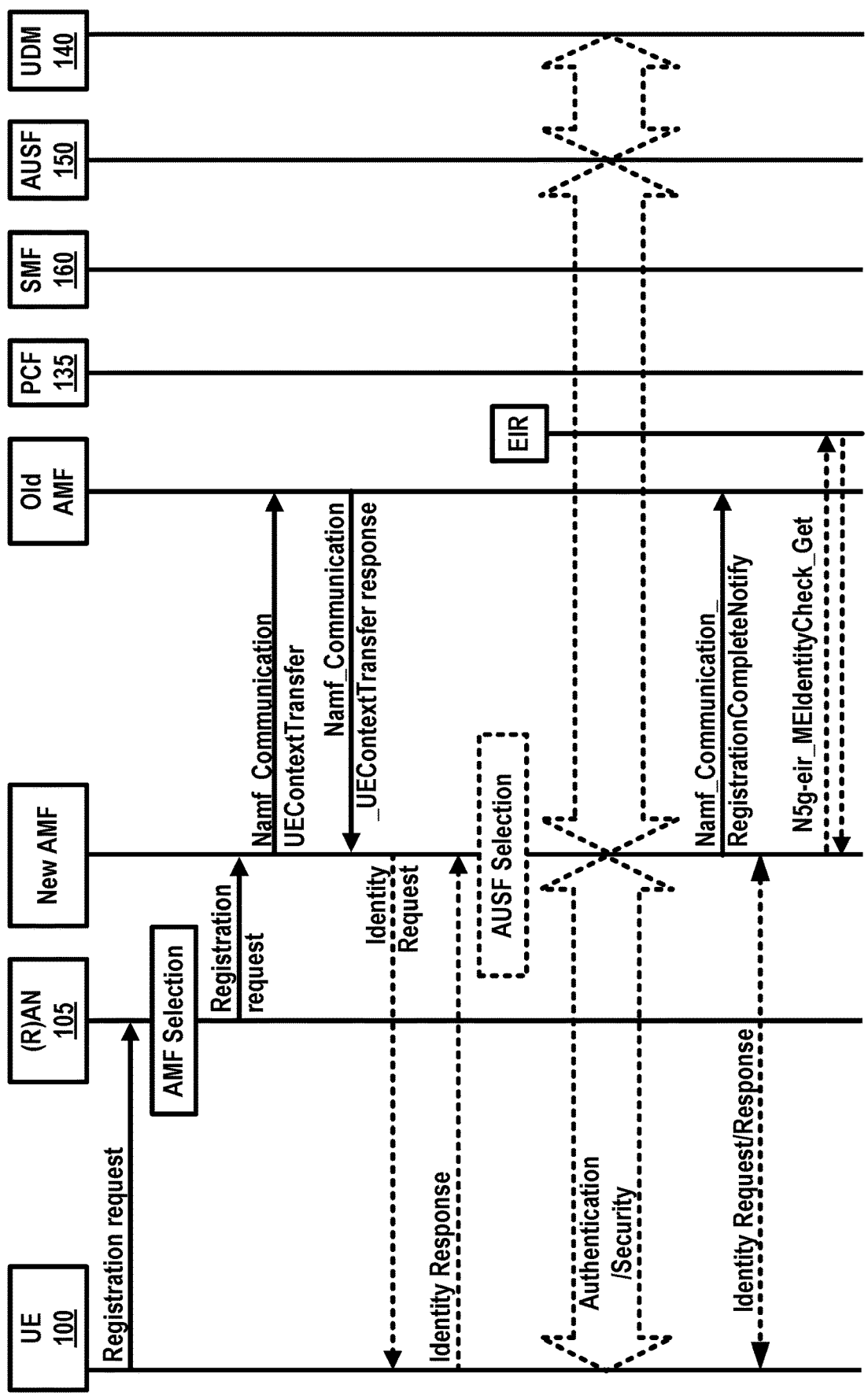
FIG. 8 is an example call flow as per an aspect of an embodiment of the present disclosure.
Figure 9:
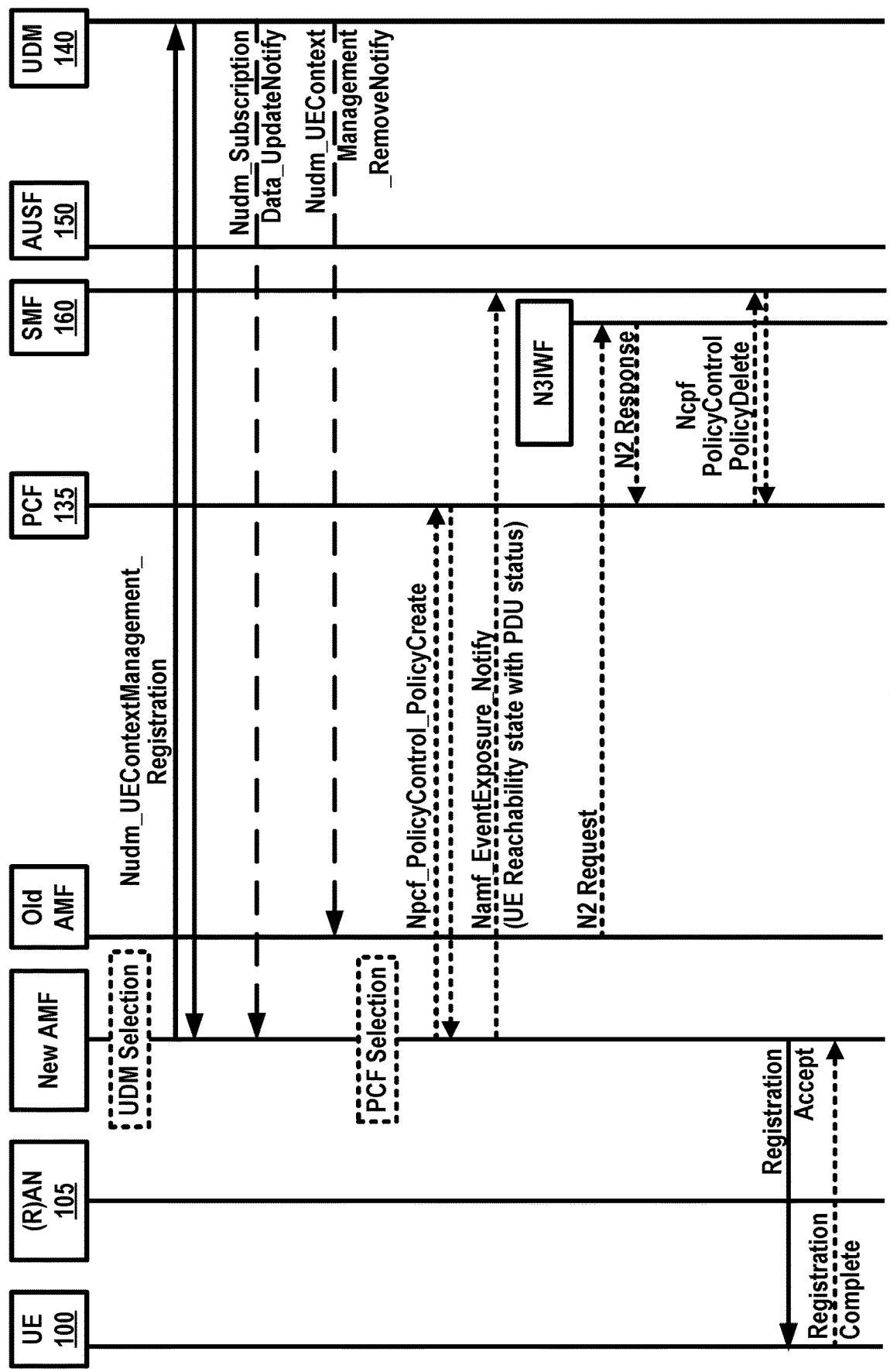
FIG. 9 is an example call flow as per an aspect of an embodiment of the present disclosure.

The initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As result of the initial registration procedure, the identity of the serving AMF 155 may be registered in UDM 140.

The registration management, RM procedures may be applicable over both 3GPP access 105 and non 3GPP access 165.

An example FIG. 5 depicts the RM states of a UE 100 as observed by the UE 100 and AMF 155. In an example embodiment, two RM states may be employed in a UE 100 and the AMF 155 that reflect the registration status of the UE 100 in the selected PLMN: RM-DEREGISTERED 500, and RM-REGISTERED 510. In the RM DEREGISTERED state 500, the UE 100 may not be registered with the network. The UE 100 context in AMF 155 may not hold valid location or routing information for the UE 100 so the UE 100 is not reachable by the AMF 155. Some UE 100 context may still be stored in the UE 100 and the AMF 155. In the RM REGISTERED state 510, the UE 100 may be registered with the network. In the RM-REGISTERED 510 state, the UE 100 may receive services that require registration with the network.

In an example embodiment, two RM states may be employed in AMF 155 for a UE 100 that reflect the registration status of the UE 100 in the selected PLMN: RM-DEREGISTERED 520, and RM-REGISTERED 530.

As shown in example FIG. 6A and FIG. 6B, connection management, CM, may comprise the functions of establishing and releasing a signaling connection between a UE 100 and the AMF 155 over N1. This signaling connection may be employed to enable NAS signaling exchange between the UE 100 and a core network. It comprises both the AN signaling connection between the UE 100 and the (R)AN 105 (e.g. RRC connection over 3GPP access) and the N2 connection for this UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state is in RM-REGISTERED 510 state and has no NAS signaling connection established with the AMF 155 over N1. The UE 100 may perform cell selection, cell reselection and PLMN selection. A UE 100 in CM-CONNECTED 610 state has a NAS signaling connection with the AMF 155 over N1.

In an example embodiment two CM states may be employed for a UE 100 at the AMF 155, CM-IDLE 620 and CM-CONNECTED 630.

RRC inactive state may apply to NG-RAN (e.g. it applies to NR and E-UTRA connected to 5G CN). The AMF 155, based on network configuration, may provide assistance information to the NG RAN 105, to assist the NG RAN's 105 decision whether the UE 100 is sent to RRC inactive state. When a UE 100 is CM-CONNECTED 610 with RRC inactive state, the UE 100 may resume the RRC connection due to uplink data pending; Mobile initiated signaling procedure; As a response to RAN 105 paging; Notifying the network that it has left the RAN 105 notification area.

NAS signaling connection management may include the functions of establishing and releasing a NAS signaling connection. NAS signaling connection establishment function may be provided by the UE 100 and the AMF 155 to establish the NAS signaling connection for a UE 100 in CM-IDLE 600 state. The procedure of releasing the NAS signaling connection may be initiated by the 5G (R)AN 105 node or the AMF 155.

Reachability management of UE 100 may detect whether a UE 100 is reachable and providing UE 100 location (e.g. access node) for the network to reach the UE 100. This may be done by paging UE 100 and UE 100 location tracking. The UE 100 location tracking may include both UE 100 registration area tracking and UE 100 reachability tracking. Such functionalities may be either located at 5GC (in case of CM-IDLE 620 state) or NG-RAN 105 (in case of CM-CONNECTED 630 state). The UE 100 and the AMF 155 may negotiate UE 100 reachability characteristics in CM-IDLE 600, 620 state during registration and registration update procedures.

Two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between a UE 100 and a data network identified by a DNN. The PDU connectivity service may be supported via PDU sessions that are established upon request from the UE 100.

A PDU session may support one or more PDU session types. PDU sessions may be established (e.g. upon UE 100 request), modified (e.g. upon UE 100 and 5GC request) and released (e.g. upon UE 100 and 5GC request) using NAS SM signaling exchanged over N1 between the UE 100 and the SMF 160. Upon request from an application server, the 5GC may be able to trigger a specific application in the UE 100. When receiving that trigger message, the UE 100 may pass it to the identified application in the UE 100. The identified application in the UE 100 may establish a PDU session to a specific DNN.

Figure 7:
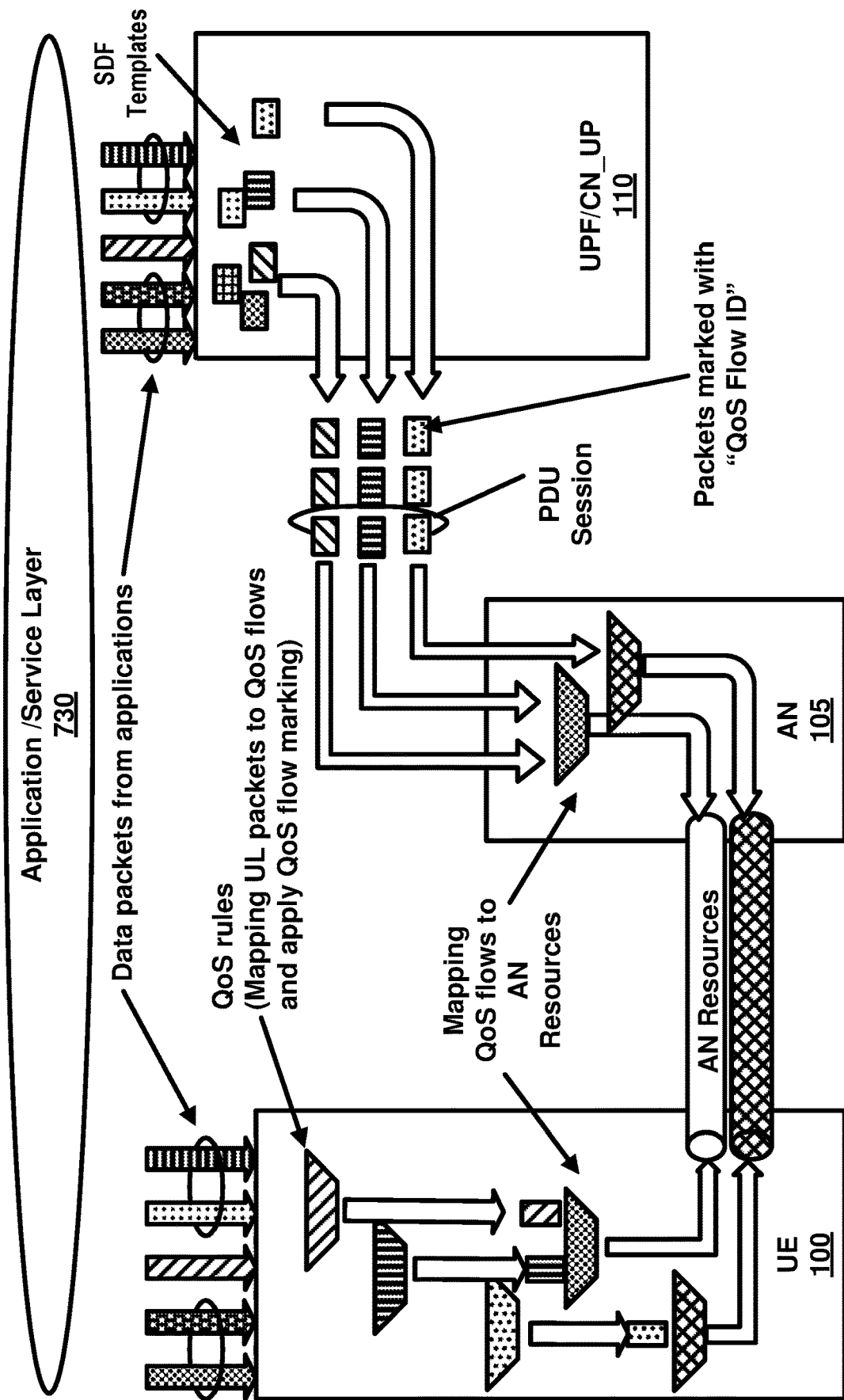
FIG. 7 is diagram for classification and marking traffic as per an aspect of an embodiment of the present disclosure.

The 5G QoS model may support a QoS flow based framework as shown in example FIG. 7. The 5G QoS model may support both QoS flows that require a guaranteed flow bit rate and QoS flows that may not require a guaranteed flow bit rate. The 5G QoS model may also support reflective QoS. The QoS model may comprise flow mapping or packet marking at the UPF 110 (CN_UP) 110, AN 105 and/or UE 100. Packets may arrive from and/or destined to the application/service layer 730 of UE 100, UPF 110 (CN_UP) 110, and/or the AF 145.

QoS flow may be a granularity of QoS differentiation in a PDU session. A QoS Flow ID, QFI, may be employed to identify a QoS flow in the 5G system. User plane traffic with the same QFI within a PDU session may receive the same traffic forwarding treatment. The QFI may be carried in an encapsulation header on N3 (and N9) e.g. without any changes to the end-to-end packet header. It may be applied to PDUs with different types of payload. The QFI may be unique within a PDU session.

The QoS parameters of a QoS flow may be provided to the (R)AN as a QoS profile over N2 at PDU session or at QoS flow establishment and when NG-RAN is used at every time the user plane is activated. A default QoS rule may be required for every PDU session. The SMF 160 may allocate the QFI for a QoS flow and may derive its QoS parameters from the information provided by the PCF. When applicable, the SMF 160 may provide the QFI together with the QoS profile containing the QoS parameters of a QoS flow to the (R)AN 105.

5G QoS flow may be a granularity for QoS forwarding treatment in a 5G system. Traffic mapped to the same 5G QoS flow may receive the same forwarding treatment (e.g. scheduling policy, queue management policy, rate shaping policy, RLC configuration, and/or the like). Providing different QoS forwarding treatment may require separate 5G QoS flow.

A 5G QoS indicator may be a scalar that is employed as a reference to a specific QoS forwarding behavior (e.g. packet loss rate, packet delay budget) to be provided to a 5G QoS flow. This may be implemented in the access network by the 5QI referencing node specific parameters that control the QoS forwarding treatment (e.g. scheduling weights, admission thresholds, queue management thresholds, link layer protocol configuration, and/or the like.).

5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. This may be based on the UE's 100 subscription data, UE 100 location, the information from application function AF 145, policy or other related traffic rules. The 5G core network may expose network information and capabilities to an edge computing application function. The functionality support for edge computing may include local routing where the 5G core network may select UPF 110 to route the user traffic to the local data network, traffic steering where the 5G core network selects the traffic to be routed to the applications in the local data network, session and service continuity to enable UE 100 and application mobility, user plane selection and reselection, e.g. based on input from application function, network capability exposure where 5G core network and application function may provide information to each other via NEF, QoS and charging where PCF may provide rules for QoS control and charging for the traffic routed to the local data network, support of local area data network where 5G core network may provide support to connect to the LADN in a certain area where the applications are deployed.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

PDU connectivity service may provide exchange of PDUs between a UE 100 and a data network. PDU session may be an association between a UE 100 and a data network, DN, that provides a PDU connectivity service. The type of association may be IP, or Ethernet or unstructured.

Establishment of user plane connectivity to a data network via a network slice instance(s) comprises of at least two steps. Performing a RM procedure to select an AMF 155 that supports the required network slices, and establishing one or more PDU session(s) to the required data network via the network slice instance(s).

The set of network slices for a UE 100 may be changed at any time while the UE 100 is registered with a network, and may be initiated by the network, or the UE 100.

A periodic registration update may be UE 100 re-registration at expiry of a periodic registration timer. A requested NSSAI is a NSSAI that the UE 100 may provide to the network. A service based interface may represent how a set of services is provided/exposed by a given NF.

A service continuity may be an uninterrupted user experience of a service, including the cases where the IP address and/or anchoring point change. A session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by SMF, towards data network.

The 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

A 5G system may reduce dependencies between the access network (AN) and the core network (CN). The architecture may comprise a converged access-agnostic core network with a common AN-CN interface which integrates different 3GPP and non-3GPP access types.

A 5G system furthermore may support a unified authentication framework, stateless NFs, where the compute resource is decoupled from the storage resource, capability exposure, and concurrent access to local and centralized services. To support low latency services and access to local data networks, UP functions may be deployed close to the access network.

A 5G system may support roaming with both home routed traffic as well as local breakout traffic in the visited PLMN. An example 5G architecture may be service-based and the interaction between network functions may be represented in two ways. (1) FIG. 1 is an example service-based representation, where network functions within the control plane, may enable other authorized network functions to access their services. This representation may also include point-to-point reference points where necessary. (2) FIG. 2 is an example reference point representation, showing the interaction between the NF services in the network functions described by point-to-point reference point (e.g. N11) between any two network functions.

A Network Slice may include at least one of the following: the Core Network Control Plane and user plane Network Functions; the 5G Radio Access Network; and/or the N3IWF functions to the non-3GPP Access Network. Network slices may differ for supported features and network functions implementation. The operator may deploy multiple Network Slice instances delivering the same features but for different groups of UEs, e.g. as they deliver a different committed service and/or because they may be dedicated to a customer. The NSSF may store the mapping information between slice instance ID and NF ID (or NF address).

A single UE 100 may simultaneously be served by one or more network slice instances via a 5G-AN. In an example, a single UE may be served by k network slices (e.g. k=8, 16, etc) at a time. An AMF instance serving the UE logically belongs to a Network Slice instances serving the UE.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a Network Slice. An S-NSSAI may be comprised of: a slice/service type (SST), which may refer to the expected Network Slice behavior in terms of features and services; and/or a slice differentiator (SD). A slice differentiator may be optional information that complements the slice/service type(s) to allow further differentiation for selecting an network slice instance from potentially multiple network slice instances that comply with the indicated slice/service type. This information may be referred to as SD. The same Network Slice instance may be selected employing different S-NSSAIs. The CN part of a Network Slice instance(s) serving a UE may be selected by CN.

Subscription data may include the S-NSSAI(s) of the Network Slices that the UE subscribes to. One or more S-NSSAIs may be marked as default S-NSSAI. In an example, k S-NSSAI may be marked Default S-NSSAI (e.g. k=8, 16, etc). In an example, the UE may subscribe to more than 8 S-NSSAI.

A UE may be configured by the HPLMN with a Configured NSSAI per PLMN. Upon successful completion of a UE's Registration procedure, the UE may obtain from the AMF an Allowed NSSAI for this PLMN, which may include one or more S-NSSAIs.

The Allowed NSSAI may take precedence over the Configured NSSAI for this PLMN. The UE may use the S-NSSAIs in the Allowed NSSAI corresponding to a Network Slice for the subsequent Network Slice selection related procedures in the serving PLMN.

The establishment of user plane connectivity to a data network via a network slice instance(s) may comprise one or more of the following steps: performing a RM procedure to select an AMF that supports the required Network Slices; establishing one or more PDU session to the required Data network via the Network Slice Instance(s).

When a UE registers with a PLMN, if the UE for this PLMN has a configured NSSAI or an allowed NSSAI, the UE may provide to the network in RRC and NAS layer a Requested NSSAI containing the S-NSSAI(s) corresponding to the slice(s) to which the UE attempts to register, in addition to the temporary user ID if one was assigned to the UE. The Requested NSSAI may be either: the Configured-NSSAI; the Allowed-NSSAI.

In an example, when a UE registers with a PLMN, if for this PLMN the UE has no Configured NSSAI or Allowed NSSAI, the RAN may route NAS signalling from/to this UE to/from a default AMF.

In an example, the network, based on local policies, subscription changes and/or UE mobility, may change the set of permitted Network Slice(s) to which the UE is registered. The network may perform such change during a Registration procedure or trigger a notification towards the UE of the change of the supported Network Slices using an RM procedure (which may trigger a Registration procedure). The Network may provide the UE with a new Allowed NSSAI and Tracking Area list.

During a Registration procedure in a PLMN, in case the network decides that the UE should be served by a different AMF based on Network Slice(s) aspects, then the AMF that first received the Registration Request may redirect the Registration request to another AMF via the RAN or via direct signaling between the initial AMF and the target AMF.

The network operator may provision the UE with Network Slice selection policy (NSSP). The NSSP includes one or more NSSP rules. An NSSP rule may associate an application with a certain S-NSSAI. A default rule which matches one or more applications to a S-NSSAI may also be included. When a UE application associated with a specific S-NSSAI requests data transmission, then:

If the UE 100 has one or more PDU sessions established corresponding to the specific S-NSSAI, the UE may route the user data of this application in one of these PDU sessions, unless other conditions in the UE 100 prohibit the use of these PDU sessions. If the application provides a DNN, then the UE 100 may consider also this DNN to determine which PDU session to use.

If the UE 100 does not have a PDU session established with this specific S-NSSAI, the UE may request a new PDU session corresponding to this S-NSSAI and with the DNN that may be provided by the application. In order for the RAN 105 to select a proper resource for supporting network slicing in the RAN 105, RAN 105 may be aware of the Network Slices used by the UE 100.

The AMF 155 may select an SMF 160 in a Network Slice instance based on S-NSSAI, DNN and other information e.g. UE 100 subscription and local operator policies, when the UE 100 triggers the establishment of a PDU session. The selected SMF 160 may establish a PDU session based on S-NSSAI and DNN.

In an example, in order to support network-controlled privacy of slice information for the slices the UE accesses, when the UE is aware or configured that privacy considerations apply to NSSAI: The UE may not include NSSAI in NAS signaling unless the UE has a NAS security context and the UE may not include NSSAI in unprotected RRC signaling.

In an example, for roaming scenarios, the Network Slice specific network functions in VPLMN and HPLMN may be selected based on the S-NSSAI provided by the UE during PDU connection establishment. If a standardized S-NSSAI is used, then selections of slice specific NF instances may be done by each PLMN based on the provided S-NSSAI. Otherwise, the VPLMN may map the S-NSSAI of HPLMN to a S-NSSAI of VPLMN based on roaming agreement (including mapping to a default S-NSSAI of VPLMN). The selection of slice specific NF instance in VPLMN may be done based on the S-NSSAI of VPLMN. The selection of any slice specific NF instance in HPLMN may be based on the S-NSSAI of HPLMN.

Figure 10:
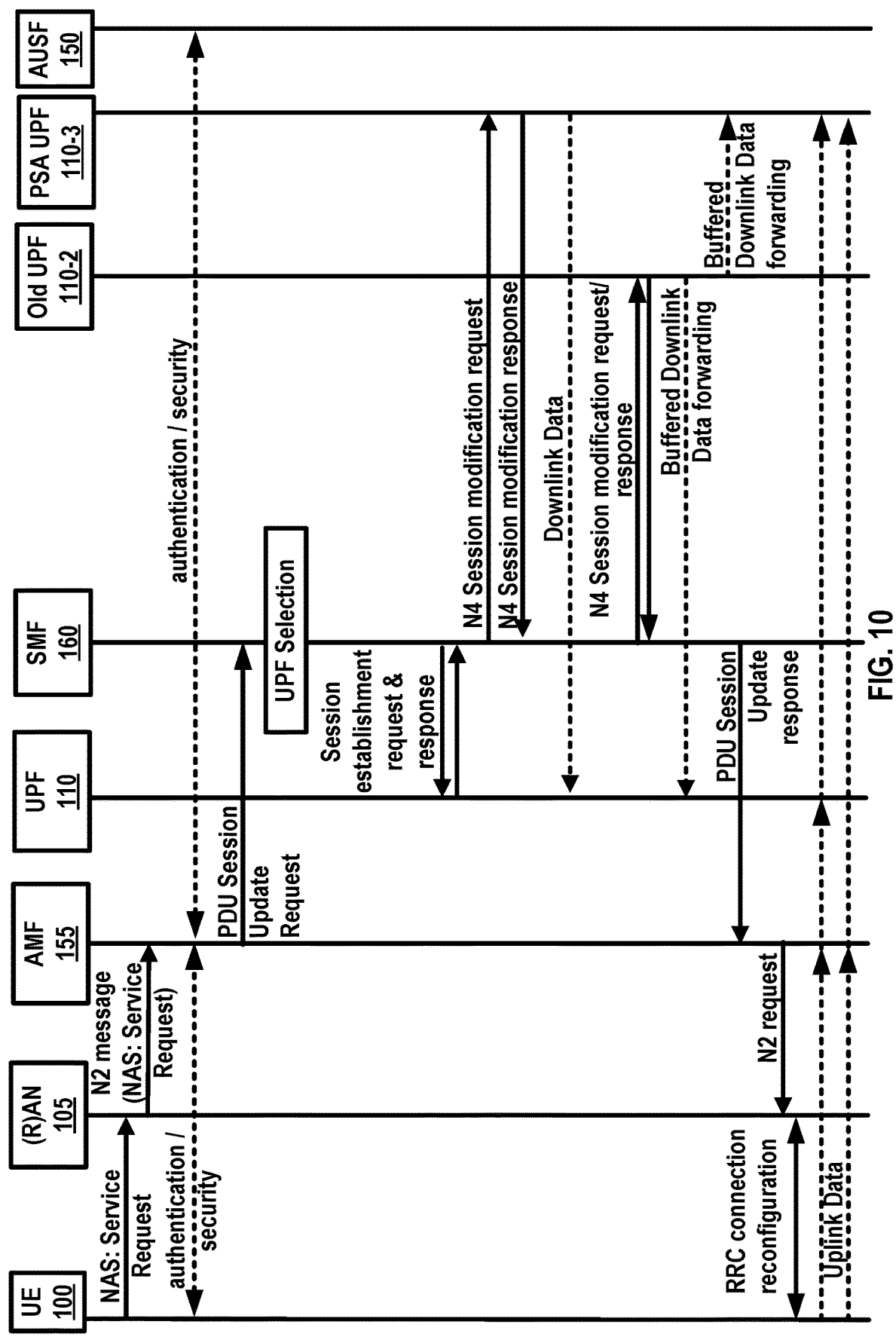
FIG. 10 is an example call flow as per an aspect of an embodiment of the present disclosure.
Figure 11:
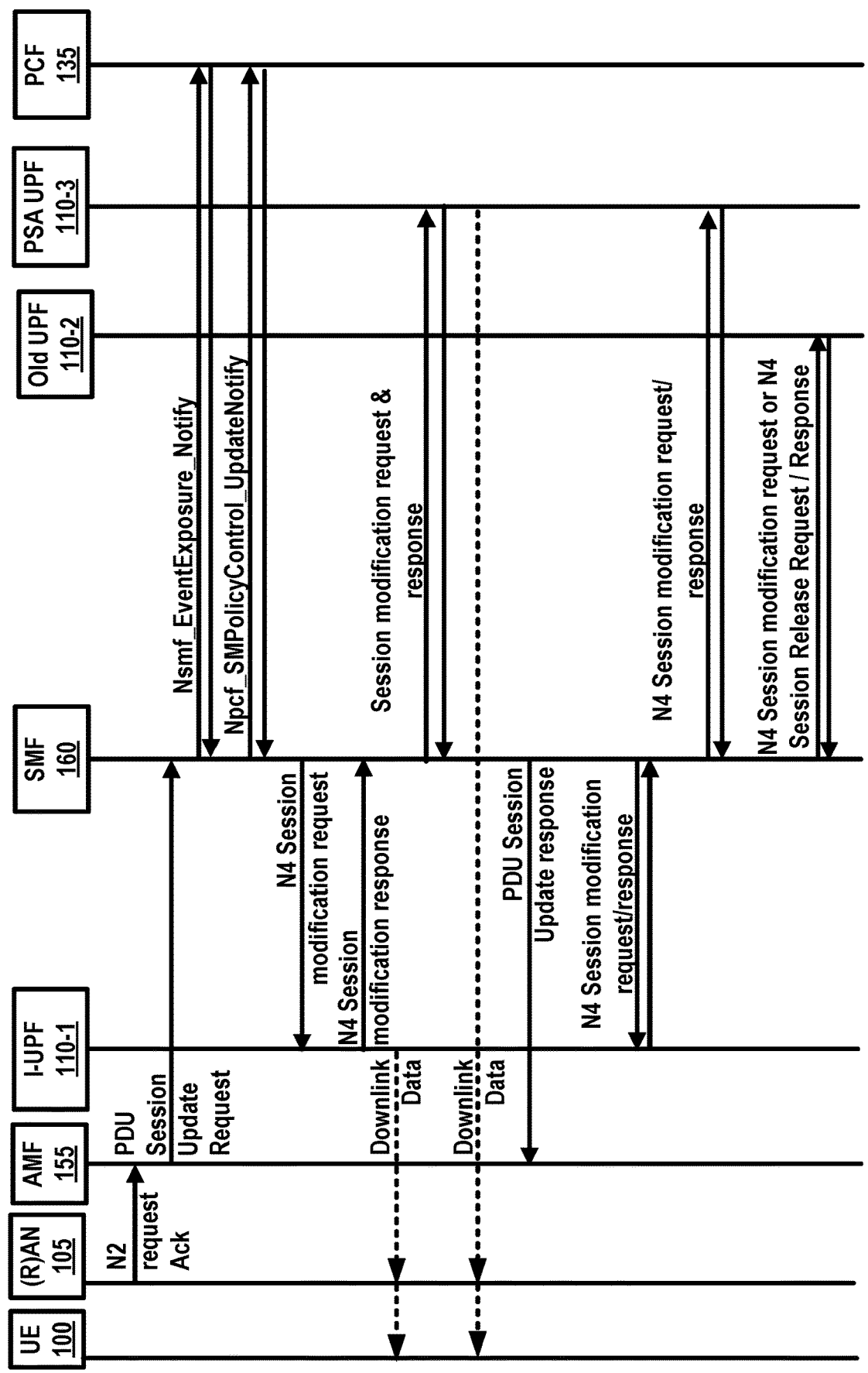
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU Session. The service request procedure may be triggered by the UE 100 or the 5GC, and may be used when the UE 100 is in CM-IDLE and/or in CM-CONNECTED and may allow selectively to activate user plane connections for some of the established PDU Sessions.

The UE 100 in CM IDLE state may initiate the service request procedure in order to send uplink signaling messages, user data, as a response to a network paging request and/or the like. After receiving the service request message, the AMF 155 may perform authentication. After the establishment of the signaling connection to the AMF 155, the UE 100 or network may send signaling messages, e.g. PDU Session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU Session Anchor PSA UPF 110-3 may be involved.

In an example, the UE 100 may send to a (R)AN 105 an AN message comprising AN parameters, Mobility Management, MM NAS Service Request (e.g., list of PDU Sessions to be activated, list of allowed PDU sessions, security parameters, PDU session status)). The list of PDU sessions to be activated may be provided by the UE 100 when the UE 100 may re-activate the PDU session(s). The list of allowed PDU sessions may be provided by the UE 100 when the service request may be a response of a paging or a NAS notification, and may identify the PDU sessions that may be transferred or associated to the access on which the Service Request may be sent. In an example, for the case of NG-RAN, the AN parameters may include selected PLMN ID and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU Session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU Session(s) whose UP connections may be activated in MM NAS service request message, by the list of PDU sessions to be activated. Otherwise the UE 100 may not identify any PDU Session(s) in the service request message for paging response.

If the service request over 3GPP access may be triggered in response to a paging indicating non-3GPP access, the NAS service request message may identify in the list of allowed PDU sessions the list of PDU Sessions associated with the non-3GPP access that may be re-activated over 3GPP. In an example, the PDU Session status may indicate the PDU sessions available in the UE 100. In an example, the UE 100 may not trigger the service request procedure for a PDU Session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message comprising N2 parameters, MM NAS Service Request, and/or the like. The AMF 155 may reject the N2 message if it may not be able to handle the service request. In an example, if NG-RAN may be used, the N2 parameters may include the 5G-GUTI, Selected PLMN ID, Location information, RAT type, Establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU Session status, the AMF 155 may initiate PDU session release procedure in the network for the PDU sessions whose PDU Session ID(s) may be indicated by the UE 100 as not available.

In an example, if the service request was not sent integrity protected or integrity protection verification failed, the AMF 155 may initiate a NAS authentication/security procedure.

In an example, if the UE 100 may trigger the service request to establish a signaling connection, upon successful establishment of the signaling connection, the UE 100 and the network may exchange NAS signaling.

In an example the AMF 155 may send to the SMF 160 a PDU session update context request e.g., Nsmf_PDUSession_UpdateSMContext Request comprising PDU Session ID(s), Cause(s), UE 100 location information, access type, and/or the like.

In an example, the Nsmf_PDUSession_UpdateSMContext Request may be invoked by the AMF 155 if the UE 100 may identify PDU Session(s) to be activated in the NAS Service Request message. In an example, the Nsmf_PDUSession_UpdateSMContext Request may be triggered by the SMF 160 wherein the PDU Session(s) identified by the UE 100 may correlate to other PDU Session ID(s) than the one triggering the procedure. In an example, the Nsmf_PDUSession_UpdateSMContext Request may be triggered by the SMF 160 wherein the current UE 100 location may be outside the "Area of validity for the N2 information" provided by the SMF 160 during a network triggered service request procedure. The AMF 155 may not send the N2 information provided by the SMF 160 during the network triggered service request procedure.

In an example, the AMF 155 may determine the PDU Session(s) to be activated and may send an Nsmf_PDUSession_UpdateSMContext Request to SMF(s) associated with the PDU Session(s) with Cause set to indicate "establishment of user plane resources" for the PDU Session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the User Plane for the PDU Session may not be re-activated. The Service Request Procedure may succeed without re-activating the User Plane of any PDU Sessions, and the AMF 155 may notify the UE 100.

In an example, if the PDU Session ID may correspond to a LADN and the SMF 160 may determine that the UE 100 may be outside the area of availability of the LADN based on the UE 100 location reporting from the AMF 155, the SMF 160 may decide to (based on local policies) keep the PDU Session, may reject the activation of user plane connection for the PDU session and may inform the AMF 155. In an example, if the procedure may be triggered by a Network Triggered Service Request, the SMF 160 may notify the UPF 110 that originated the Data Notification to discard downlink data for the PDU Sessions and/or to not provide further Data Notification messages. The SMF 160 may respond to the AMF 155 with an appropriate reject cause and the User Plane Activation of PDU Session may be stopped.

In an example, if the PDU Session ID may correspond to a LADN and the SMF 160 may determine that the UE 100 may be outside the area of availability of the LADN based on the UE 100 location reporting from the AMF 155, the SMF 160 may decide to (based on local policies) release the PDU Session. The SMF 160 may locally release the PDU Session and may inform the AMF 155 that the PDU Session may be released. The SMF 160 may respond to the AMF 155 with an appropriate reject cause and the User Plane Activation of PDU Session may be stopped.

In an example, if the UP activation of the PDU Session may be accepted by the SMF 160, based on the location info received from the AMF 155, the SMF 160 may check the UPF 110 Selection Criteria (e.g., slice isolation requirements, slice coexistence requirements, UPF's dynamic load, UPF's relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for an UE 100, Data Network Name (DNN), PDU Session Type (i.e. IPv4, IPv6, Ethernet Type or Unstructured Type) and if applicable, the static IP address/prefix, SSC mode selected for the PDU Session, UE 100 subscription profile in UDM, DNAI as included in the PCC Rules, Local operator policies, S-NSSAI, Access technology being used by the UE 100, UPF logical topology, and/or the like), and may determine to perform one or more of the following:

continue using the current UPF(s);
  may select a new intermediate UPF 110 (or add/remove an intermediate UPF 110), if the UE 100 has moved out of the service area of the UPF 110 that was previously connecting to the AN, while maintaining the UPF(s) acting as PDU Session Anchor;

may trigger re-establishment of the PDU Session to perform relocation of the UPF 110 acting as PDU Session Anchor, e.g. the UE 100 has moved out of the service area of the anchor UPF 110 which is connecting to RAN 105.

In an example, the SMF 160 may send to the UPF 110 (e.g., new intermediate UPF 110) an N4 Session Establishment Request. In an example, if the SMF 160 may select a new UPF 110 to act as intermediate UPF 110-2 for the PDU Session, or if the SMF 160 may select to insert an intermediate UPF for a PDU Session which may not have an intermediate UPF 110-2, an N4 Session Establishment Request message may be sent to the new UPF 110, providing Packet detection, Data forwarding, enforcement and reporting rules to be installed on the new intermediate UPF. The PDU Session Anchor addressing information (on N9) for this PDU Session may be provided to the intermediate UPF 110-2.

In an example, if a new UPF 110 is selected by the SMF 160 to replace the old (intermediate) UPF 110-2, the SMF 160 may include a Data forwarding indication. The Data Forwarding Indication may indicate to the UPF 110 that a second tunnel endpoint may be reserved for buffered DL data from the old I-UPF.

In an example, the new UPF (intermediate) may send to SMF 160 an N4 Session Establishment Response message. In case the UPF may allocate CN Tunnel Info, the UPF 110 may provide DL CN Tunnel Info for the UPF 110 acting as PDU Session Anchor and UL CN Tunnel Info (e.g., CN N3 tunnel info) to the SMF 160. If the Data forwarding indication may be received, the new (intermediate) UPF 110 acting as N3 terminating point may send DL CN Tunnel Info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU Session or may remove the old I-UPF 110-2, the SMF 160 may send N4 Session Modification Request message to PDU Session Anchor, PSA UPF 110-3, providing the data forwarding indication and DL tunnel information from new intermediate UPF 110.

In an example, if the new intermediate UPF 110 may be added for the PDU Session, the (PSA) UPF 110-3 may begin to send the DL data to the new I-UPF 110 as indicated in the DL tunnel information.

In an example, if Service Request may be triggered by the network, and the SMF 160 may remove the old I-UPF 110-2 and may not replace the old I-UPF 110-2 with the new I-UPF 110, the SMF 160 may include the Data Forwarding indication in the request. The Data Forwarding Indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 Session Modification Response. In an example, if the Data Forwarding Indication may be received, the PSA UPF 110-3 may become as N3 Terminating Point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 (intermediate) an N4 Session Modification Request (e.g., may comprise New UPF 110 address, New UPF 110 DL Tunnel ID, and/or the like). In an example, if the service request may be triggered by the network, and/or the SMF 160 may remove the old (intermediate) UPF 110-2, the SMF 160 may send the N4 Session Modification Request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF (PSA) 110-3 acting as N3 terminating point. The SMF 160 may start a timer to monitor the forwarding tunnel. In an example, the old (intermediate) UPF 110-2 may send N4 Session Modification Response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF may not be assigned for the PDU session and forwarding tunnel may be established to the UPF (PSA) 110-3, the old (intermediate) UPF 110-2 may forward its buffered data to the UPF (PSA) 110-3 acting as N3 Terminating Point.

In an example, the SMF 160 may send to the AMF 155 an N11 message e.g., a Nsmf_PDUSession_UpdateSMContext Response (comprising: N1 SM container (PDU Session ID, PDU Session re-establishment indication), N2 SM information (PDU Session ID, QoS profile, CN N3 Tunnel Info, S-NSSAI), Cause), upon reception of the Nsmf_PDUSession_UpdateSMContext Request with a cause including e.g., "establishment of user plane resources". The SMF 160 may determine whether UPF 110 reallocation may be performed, based on the UE 100 location information, UPF 110 service area and operator policies. In an example, for a PDU Session that the SMF 160 may determine to be served by the current UPF 110, e.g., PDU Session Anchor or intermediate UPF, the SMF 160 may generate N2 SM information and may send an Nsmf_PDUSession_UpdateSMContext Response to the AMF 155 to establish the User Plane(s). The N2 SM information may contain information that the AMF 155 may provide to the RAN 105. In an example, for a PDU Session that the SMF 160 may determine as requiring a UPF 110 relocation for PDU Session Anchor UPF, the SMF 160 may reject the activation of UP of the PDU Session by sending Nsmf_PDUSession_UpdateSMContext Response that may contain N1 SM container to the UE 100 via the AMF 155. The N1 SM container may include the corresponding PDU Session ID and PDU Session re-establishment indication.

Upon reception of the Namf_EventExposure_Notify from the AMF 155 to the SMF 160, with an indication that the UE 100 is reachable, if the SMF 160 may have pending DL data, the SMF 160 may invokes the Namf_Communication_N1N2MessageTransfer service operation to the AMF 155 to establish the User Plane(s) for the PDU Sessions. In an example, the SMF 160 may resume sending DL data notifications to the AMF 155 in case of DL data.

In an example, the SMF 160 may send to a message to the AMF 155 to reject the activation of UP of the PDU Session by including a cause in the Nsmf_PDUSession_UpdateSMContext Response if the PDU Session may correspond to a LADN and the UE 100 may be outside the area of availability of the LADN, or if the AMF 155 may notify the SMF

160 that the UE 100 may be reachable for regulatory prioritized service, and the PDU Session to be activated may not for a regulatory prioritized service; or if the SMF 160 may decide to perform PSA UPF 110-3 relocation for the requested PDU Session.

In an example, the AMF 155 may send to the (R)AN 105 an N2 Request message (e.g., N2 SM information received from SMF 160, security context, AMF 155 Signaling Connection ID, Handover Restriction List, MM NAS Service Accept, list of recommended cells/TAs/NG-RAN node identifiers). In an example, the RAN 105 may store the Security Context, AMF 155 Signaling Connection Id, QoS Information for the QoS Flows of the PDU Sessions that may be activated and N3 Tunnel IDs in the UE 100 RAN 105 context. In an example, the MM NAS Service Accept may include PDU Session status in the AMF 155. If the activation of UP of a PDU Session may be rejected by the SMF 160, the MM NAS Service Accept may include the PDU Session ID and the reason why the user plane resources may not activated (e.g. LADN not available). Local PDU Session release during the Session Request procedure may be indicated to the UE 100 via the Session Status.

In an example, if there are multiple PDU Sessions that may involve multiple SMFs, the AMF 155 may not wait for responses from all SMFs before it may send N2 SM information to the UE 100. The AMF 155 may wait for all responses from the SMFs before it may send MM NAS Service Accept message to the UE 100.

In an example, the AMF 155 may include at least one N2 SM information from the SMF 160 if the procedure may be triggered for PDU Session User Plane activation. AMF 155 may send additional N2 SM information from SMFs in separate N2 message(s) (e.g. N2 tunnel setup request), if there is any. Alternatively, if multiple SMFs may be involved, the AMF 155 may send one N2 Request message to (R)AN 105 after all the Nsmf_PDUSession_UpdateSMContext Response service operations from all the SMFs associated with the UE 100 may be received. In such case, the N2 Request message may include the N2 SM information received in each of the Nsmf_PDUSession_UpdateSMContext Response and PDU Session ID to enable AMF 155 to associate responses to relevant SMF 160.

In an example, if the RAN 105 (e.g., NG RAN) node may provide the list of recommended cells/TAs/NG-RAN node identifiers during the AN Release procedure, the AMF 155 may include the information from the list in the N2 Request. The RAN 105 may use this information to allocate the RAN 105 Notification Area when the RAN 105 may decide to enable RRC Inactive state for the UE 100.

If the AMF 155 may receive an indication, from the SMF 160 during a PDU Session Establishment procedure that the UE 100 may be using a PDU Session related to latency sensitive services, for any of the PDU Sessions established for the UE 100 and the AMF 155 has received an indication from the UE 100 that may support the CM-CONNECTED with RRC Inactive state, then the AMF 155 may include the UE's "RRC Inactive Assistance Information". In an example, the AMF 155 based on network configuration, may include the UE's "RRC Inactive Assistance Information".

In an example, the (R)AN 105 may send to the UE 100 a message to perform RRC Connection Reconfiguration with the UE 100 depending on the QoS Information for all the QoS Flows of the PDU Sessions whose UP connections may be activated and Data Radio Bearers. In an example, the User Plane security may be established.

In an example, if the N2 Request may include a MM NAS Service Accept message, the RAN 105 may forward the MM NAS Service Accept to the UE 100. The UE 100 may locally delete context of PDU Sessions that may not be available in 5GC.

In an example, if the N1 SM information may be transmitted to the UE 100 and may indicate that some PDU Session(s) may be re-established, the UE 100 may initiate PDU Session re-establishment for the PDU Session(s) that me be re-established after the Service Request procedure may be complete.

In an example, after the User Plane radio resources may be setup, the uplink data from the UE 100 may be forwarded to the RAN 105. The RAN 105 (e.g., NG-RAN) may send the uplink data to the UPF address and Tunnel ID provided.

In an example, the (R)AN 105 may send to the AMF 155 an N2 Request Ack (e.g., N2 SM information (comprising: AN Tunnel Info, List of accepted QoS Flows for the PDU Sessions whose UP connections are activated, List of rejected QoS Flows for the PDU Sessions whose UP connections are activated)). In an example, the N2 request message may include N2 SM information(s), e.g. AN Tunnel Info. RAN 105 may respond N2 SM information with separate N2 message (e.g. N2 tunnel setup response). In an example, if multiple N2 SM information are included in the N2 Request message, the N2 Request Ack may include multiple N2 SM information and information to enable the AMF 155 to associate the responses to relevant SMF 160.

In an example, the AMF 155 may send to the SMF 160 a Nsmf_PDUSession_UpdateSMContext Request (N2 SM information (AN Tunnel Info), RAT Type) per PDU Session. If the AMF 155 may receive N2 SM information (one or multiple) from the RAN 105, then the AMF 155 may forward the N2 SM information to the relevant SMF 160. If the UE 100 Time Zone may change compared to the last reported UE 100 Time Zone then the AMF 155 may include the UE 100 Time Zone IE in the Nsmf_PDUSession_UpdateSMContext Request message.

In an example, if dynamic PCC is deployed, the SMF 160 may initiate notification about new location information to the PCF (if subscribed) by invoking an event exposure notification operation (e.g., a Nsmf_EventExposure_Notify service operation). The PCF may provide updated policies by invoking a policy control update notification message (e.g., a Npcf_SMPolicyControl_UpdateNotify operation).

In an example, if the SMF 160 may select a new UPF 110 to act as intermediate UPF 110 for the PDU session, the SMF 160 may initiates an N4 Session modification procedure to the new I-UPF 110 and may provide AN Tunnel Info. The Downlink Data from the new I-UPF may be forwarded to RAN 105 and UE 100. In an example, the UPF may send to the SMF 160, an N4 Session Modification Response. In an example, the SMF 160 may send to the AMF 155, an Nsmf_PDUSession_UpdateSMContext Response.

In an example, if forwarding tunnel may be established to the new I-UPF 110 and if the timer SMF 160 set for forwarding tunnel may be expired, the SMF 160 may sends N4 Session modification request to new (intermediate) UPF 110 acting as N3 terminating point to release the forwarding tunnel. In an example, the PSA UPF 110-3 may send to the SMF 160 an N4 session modification response. In an example, the SMF 160 may send to the old UPF 110-2 an N4 Session Modification Request, or N4 Session Release Request. In an example, if the SMF 160 may continue using the old UPF 110-2, the SMF 160 may send an N4 Session Modification Request, providing AN Tunnel Info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 Session Release Request (Release Cause) to the old intermediate UPF 110-2.

In an example, the old intermediate UPF 110-2 may send to the SMF 160 an N4 Session Modification Response or N4 Session Release Response. The old UPF 110-2 may acknowledge with the N4 Session Modification Response or N4 Session Release Response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of "area of interest" and if the UE's current location may indicate that it may be moving into or moving outside of the "Area of interest" subscribed, or if the SMF 160 had subscribed for "LADN DNN" and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

The UPF 110 selection functionality in the SMF 160 may optionally utilize the NRF to discover UPF instance(s). The new UPF instances may register with the NRF 130. The NRF 130 may be configured by OAM 175 with information on the available UPF(s) or the UPF may register itself onto the NRF 130. The SMF 160 may decide to insert in the data path of a PDU Session a UPF 110 supporting the UL CL functionality during or after the PDU Session establishment, or to remove from the data path of a PDU Session a UPF 110 supporting the UL CL functionality after the PDU Session establishment. The SMF 160 may include more than one UPF 110 supporting the UL CL functionality in the data path of a PDU Session. The present invention enables selection of the UPF 110 (e.g., the UPF that may be registered with the NRF 130) that has the required UL CL support functionality.

In an example embodiment, when the PDU session establishment procedure may be employed, the UE 100 may send to the AMF 155 a NAS Message (or a SM NAS message) comprising NSSAI, S-NSSAI (e.g., requested S-NSSAI, allowed S-NSSAI, subscribed S-NSSAI, and/or the like), DNN, PDU Session ID, Request type, Old PDU Session ID, N1 SM container (PDU Session Establishment Request), and/or the like. In an example, the UE 100, in order to establish a new PDU Session, may generate a new PDU Session ID. In an example, when Emergency service may be required and an Emergency PDU Session may not already be established, the UE 100 may initiate the UE 100 Requested PDU Session establishment procedure with a Request Type indicating "Emergency Request". In an example, the UE 100 may initiate the UE 100 Requested PDU Session establishment procedure by the transmission of the NAS message containing a PDU Session Establishment Request within the N1 SM container. The PDU Session Establishment Request may include a PDU Type, SSC mode, Protocol Configuration Options, and/or the like. In an example, the Request Type may indicate "Initial request" if the PDU Session Establishment is a request to establish the new PDU Session and may indicate "Existing PDU Session" if the request refers to an existing PDU Session between 3GPP access and non-3GPP access or to an existing PDN connection in EPC. In an example, the Request Type may indicate "Emergency Request" if the PDU Session Establishment may be a request to establish a PDU Session for Emergency services. The Request Type may indicate "Existing Emergency PDU Session" if the request refers to an existing PDU Session for Emergency services between 3GPP access and non-3GPP access. In an example, the NAS message sent by the UE 100 may be encapsulated by the AN in a N2 message towards the AMF that may include User location information and Access Technology Type Information. In an example, the PDU Session Establishment Request message may contain SM PDU DN Request Container containing information for the PDU Session authorization by the external DN. In an example, if the procedure may be triggered for SSC mode 3 operation, the UE 100 may include the Old PDU Session ID which may indicate the PDU Session ID of the on-going PDU Session to be released, in the NAS message. The Old PDU Session ID may be an optional parameter which may be included in this case. In an example, the AMF 155 may receive from the AN the NAS message (e.g., NAS SM message) together with User Location Information (e.g. Cell Id in case of the RAN). In an example, the UE 100 may not trigger a PDU Session establishment for a PDU Session corresponding to a LADN when the UE 100 is outside the area of availability of the LADN.

In an example, the AMF 155 may determine that the NAS message or the SM NAS message may correspond to the request for the new PDU Session based on that Request Type indicates "initial request" and that the PDU Session ID may not be used for any existing PDU Session(s) of the UE 100. If the NAS message does not contain an S-NSSAI, the AMF 155 may determine a default S-NSSAI for the requested PDU Session either according to the UE 100 subscription, if it may contain only one default S-NSSAI, or based on operator policy. In an example, the AMF 155 may select an SMF 160. If the Request Type may indicate "Initial request" or the request may be due to handover from EPS, the AMF 155 may store an association of the S-NSSAI, the PDU Session ID and a SMF ID. In an example, if the Request Type is "initial request" and if the Old PDU Session ID indicating the existing PDU Session may be contained in the message, the AMF may select the SMF and may store an association of the new PDU Session ID and the selected SMF ID.

In an example, the AMF 155 may send to the SMF 160, an N11 message, e.g., Nsmf_PDUSession_CreateSMContext Request (comprising: SUPI or PEI, DNN, S-NSSAI, PDU Session ID, AMF ID, Request Type, N1 SM container (PDU Session Establishment Request), User location information, Access Type, PEI, GPSI), or Nsmf_PDUSession_UpdateSMContext Request (SUPI, DNN, S-NSSAI, PDU Session ID, AMF ID, Request Type, N1 SM container (PDU Session Establishment Request), User location information, Access Type, RAT type, PEI). In an example, if the AMF 155 may not have an association with the SMF 160 for the PDU Session ID provided by the UE 100 (e.g when Request Type indicates "initial request"), the AMF may invoke the Nsmf_PDUSession_CreateSMContext Request, but if the AMF already has an association with an SMF for the PDU Session ID provided by the UE 100 (e.g when Request Type indicates "existing PDU Session"), the AMF may invoke the Nsmf_PDUSession_UpdateSMContext Request. In an example, the AMF ID may be the UE's GUAMI which uniquely identifies the AMF 155 serving the UE 100. The AMF 155 may forward the PDU Session ID together with the N1 SM container containing the PDU Session Establishment Request received from the UE 100. The AMF 155 may provide the PEI instead of the SUPI when the UE 100 has registered for Emergency services without providing the SUPI. In case the UE 100 has registered for Emergency services but has not been authenticated, the AMF 155 may indicate that the SUPI has not been authenticated.

In an example, if the Request Type may indicate neither "Emergency Request" nor "Existing Emergency PDU Session" and, if the SMF 160 has not yet registered and subscription data may not be available, the SMF 160 may register with the UDM 140, and may retrieve subscription data and subscribes to be notified when subscription data may be modified. In an example, if the Request Type may indicate "Existing PDU Session" or "Existing Emergency PDU Session" the SMF 160 may determine that the request may be due to handover between 3GPP access and non-3GPP access or due to handover from EPS. The SMF 160 may identify the existing PDU Session based on the PDU Session ID. The SMF may not create a new SM context but instead may update the existing SM context and may provide the representation of the updated SM context to the AMF 155 in the response. if the Request Type may be "Initial request" and if the Old PDU Session ID may be included in Nsmf_PDUSession_CreateSMContext Request, the SMF 160 may identify the existing PDU Session to be released based on the Old PDU Session ID.

In an example, the SMF 160 may send to the AMF 155, the N11 message response, e.g., either a PDU Session Create/Update Response, Nsmf_PDUSession_CreateSMContext Response(Cause, SM Context ID or N1 SM container (PDU Session Reject(Cause))) or an Nsmf_PDUSession_UpdateSMContext Response.

In an example, if the SMF 160 may need to perform secondary authorization/authentication during the establishment of the PDU Session by a DN-AAA server, the SMF 160 may select a UPF 110 and may trigger a PDU Session establishment authentication/authorization.

In an example, if the Request Type may indicate "Initial request", the SMF 160 may select an SSC mode for the PDU Session. The SMF 160 may select one or more UPFs as needed. In case of PDU Type IPv4 or IPv6, the SMF 160 may allocate an IP address/prefix for the PDU Session. In case of PDU Type IPv6, the SMF 160 may allocate an interface identifier to the UE 100 for the UE 100 to build its link-local address. For Unstructured PDU Type the SMF 160 may allocate an IPv6 prefix for the PDU Session and N6 point-to-point tunneling (based on UDP/IPv6).

Figure 12:
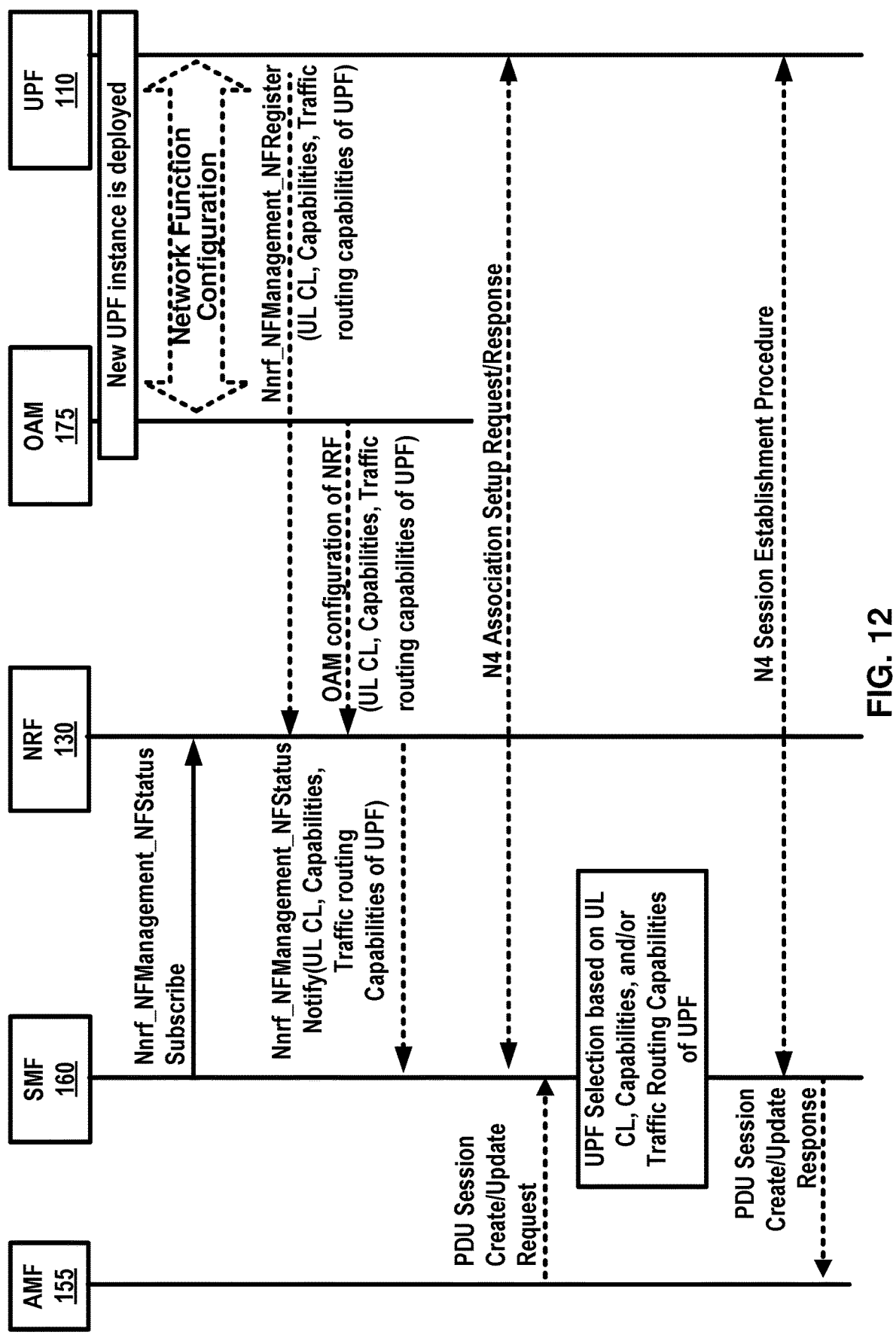
FIG. 12 is an example call flow as per an aspect of an embodiment of the present disclosure.

An example FIG. 12, may depict an example embodiment wherein the UPF 110 may register and/or configure itself with the NRF 130 or the OAM 175.

In an example embodiment, the NRF 130 may receive from the SMF 160, a first message indicating a request of updated network function information. The first message, may be a network function status subscribe message (e.g., Nnrf_NFManagement_NFStatusSubscribe) that may indicate a request from the SMF for notification of a newly registered UPF 110, an update on the status of the UPF 110, and/or the like. In an example, the first message may comprise a network function NF type of the target NF (e.g., the UPF 110), a NF identifier of the SMF 160, required NF services, FQDN of the SMF 160, IP address of the SMF 160, and/or the like. In an example, the NRF 130 may receive from a first network element, a second message. In an example, the first network element may be the OAM 175, the UPF 110, and/or the like. In an example, the second message may comprise an uplink classifier indication parameter for a network function. The network function may be the UPF 110, the first network element, and/or the like.

In an example, the second message may further comprise an identifier of the network function, a capability information of the network function, a traffic routing capability of the network function, a network function type of the network function, an IP address of the network function, a fully qualified domain name (FQDN) of the network function, a profile of the network function, a list of supported S-NSSAIs, and/or the like. In an example, the profile of the network function may be employed to describe the characteristics of the NF instance. When one core network, CN NF instance is instantiated, the associated NF profile may be generated and stored on the NF instance. During the service registration procedure, the NF profile may be registered and stored on the NRF 130. The profile of the network function may comprise at the NF Type, the FQDN and IP address of the NF instance, Network Slice related Identifier(s) e.g. S-NSSAI, NSI ID, NF capacity information, permissions, authorization information, and/or the like.

In an example embodiment, the traffic routing capability may indicate that the network function may support an IPv6 multi-homing functionality. The IPv6 multi-homing functionality may enable association of a PDU session with multiple IPv6 prefixes. In an example, the IPv6 multi-homing functionality may provide access to a Data Network (DN) via more than one PDU Session Anchor e.g., more than one UPF 110.

In an example, the uplink classifier indication parameter may indicate that the network function may support an uplink classifier functionality (e.g., UL CL functionality). In an example, the uplink classifier functionality may apply filtering rules (e.g. to examine the destination IP address/Prefix of UL IP packets sent by the UE 100) and may determine how packets should be routed. The UPF 110 supporting the uplink classifier functionality (UL CL) may be controlled by the SMF 160 to support traffic measurement for charging, traffic replication for lawful intercept, LI, bit rate enforcement (per PDU Session Aggregate Maximum Bit Rate, AMBR), and/or the like. In an example, the uplink classifier functionality may employ traffic detection, traffic forwarding rules, and/or the like, that may be provided by the SMF 160. In an example, for PDU Sessions of type IPv4, IPv6 or Ethernet, the SMF 160 may decide to insert in the data path of the PDU Session an Uplink Classifier, UL CL. The UL CL functionality may be supported by an UPF 110 that may divert (locally) some traffic matching traffic filters provided by the SMF 160. The insertion and removal of the UL CL may be decided by the SMF 160 and may be controlled by the SMF 160 using generic N4 procedures and UPF 110 capabilities. The SMF 160 may decide to insert in the data path of the PDU Session the UPF 110 supporting the UL CL functionality during or after the PDU Session establishment, or to remove from the data path of the PDU Session the UPF 110 supporting the UL CL functionality after the PDU Session establishment. The SMF 160 may include more than one UPF 110 supporting the UL CL functionality in the data path of the PDU Session.

In an example, the NRF 130 may send to the SMF 160 a third message in response to receiving the second message. The third message may be a network function status notify message (e.g., Nnrf_NF Management_NFStatusNotify). The third message may comprise the identifier of the network function, the uplink classifier indication parameter, the capability information of the network function, the traffic routing capability of the network function, the network function type of the network function, the IP address of the network function, the fully qualified domain name (FQDN)

of the network function, the profile of the network function, the list of supported S-NSSAIs, and/or the like.

In an example embodiment, the SMF 160 may receive from the AMF 155 a fourth message indicating a creation request or a modification request of one or more PDU sessions for a wireless device, the UE 100. In an example, the fourth message may be the N11 message (e.g., the N11 message from the AMF 155 to the SMF 160 as part of the PDU session establishment procedure, the N11 message from the AMF 155 to the SMF 160 as part of the service request procedure, and/or the like) indicating the creation request of one or more PDU sessions (e.g., a session creation request message, a session modification request message, and/or the like). The session creation request may be part of the service request procedure, the PDU session establishment, and/or the like of the wireless device, the UE 100. The session creation/modification request may comprise one or more of NSSAI, S-NSSAI (e.g., requested S-NSSAI, allowed S-NSSAI, subscribed S-NSSAI, and/or the like), DNN, PDU Session ID, Request type, Old PDU Session ID, N1 SM container (PDU Session Establishment Request), and/or the like. In an example embodiment, if the SMF 160 may determine that a new UPF 110 may be selected (e.g., based on an initial request indication, an indication for selecting a new intermediate UPF 110, and/or the like), the SMF 160 may select the new UPF 110 based on one or more of the following: the uplink classifier indication parameter, the traffic routing capability, UPF's dynamic load, UPF's relative static capacity among UPFs supporting the same DNN, UPF 110 location available at the SMF 160, UE 100 location information, Capability of the UPF 110 and the functionality required for the particular UE 100 session. In an example, the appropriate UPF 110 may be selected by matching the functionality and features required for the UE 100, Data Network Name (DNN), PDU Session Type (i.e. IPv4, IPv6, Ethernet Type or Unstructured Type) and if applicable, the static IP address/prefix, SSC mode selected for the PDU Session, UE 100 subscription profile in UDM 140, DNAI as included in the PCC Rules, Local operator policies, S-NSSAI, Access technology being used by the UE 100, UPF logical topology, and/or the like.

In an example, the SMF 160 may determine that the one or more PDU session may require the uplink classifier functionality. In an example, the SMF 160 may select the network function, or the UPF 110 in response to the determining. The SMF may select the network function or the UPF 110 based on the uplink classifier indication parameter.

In an example embodiment, the SMF 160 may send to the UPF 110 a fifth message indicating the PDU session creation request (e.g., an N4 session establishment/modification). The session establishment/modification may be part of an N4 session management procedure that may be employed to control the functionality of the UPF 110. The SMF 160 may create, update and/or remove an N4 session context in the UPF 110. The N4 session establishment procedure may be employed to create the initial N4 session context for the PDU Session at the UPF 110. The SMF 160 may assign a new N4 Session ID and may provide the new N4 Session ID to the UPF 110. The N4 Session ID may be stored by both entities (e.g., the SMF 160 and the UPF 110) and may be employed to identify the N4 session context during their interaction. The SMF 160 may store the relation between the N4 Session ID and PDU Session for the UE 100. The fifth message (e.g, the N4 session establishment request) may comprise Packet detection, Data forwarding, enforcement and reporting rules to be installed on the UPF 110. In an example, the UPF 110 may send the N4 Session Establishment Response message to the SMF 160. In case the UPF 110 may allocate CN Tunnel Info, the UPF 110 may provide DL CN Tunnel Info for the UPF 110 acting as PDU Session Anchor and UL CN Tunnel Info (i.e. CN N3 tunnel info) to the SMF 160.

In an example embodiment, an N4 Association Setup procedure may be employed to setup an N4 association between the SMF 160 and the UPF 110, to enable the SMF 160 to use the resources of the UPF 110 to establish N4 Sessions. The SMF 160 and the UPF 110 may exchange supported functionalities on each side during the N4 Association Setup procedure. The setup of the N4 association may be initiated by the SMF 160. The SMF 160 may initiate the N4 Association Setup procedure to request to setup an N4 association towards the UPF 110 prior to establishing a first N4 session on the UPF 110. When receiving an N4 Association Setup Request from the SMF 160, the UPF 110 may send an N4 Association Setup Response. In an example, the N4 association setup request may comprise at least one or more of a unique identifier (e.g., IP address, FQDN, and/or the like) of the SMF 160, a recovery time stamp indicating when the SMF 160 was started, the SMF 160 supported features, and/or the like. In an example, the N4 association setup response may comprise at least one or more of a unique identifier (e.g., IP address, FQDN, and/or the like) of the UPF 110, a recovery time stamp indicating when the UPF 110 was started, the UPF 110 supported features, the UPF 110 IP resource information (e.g., IPv4, IPv6 address, range of TEID and/or the like), and/or the like.

Figure 13:
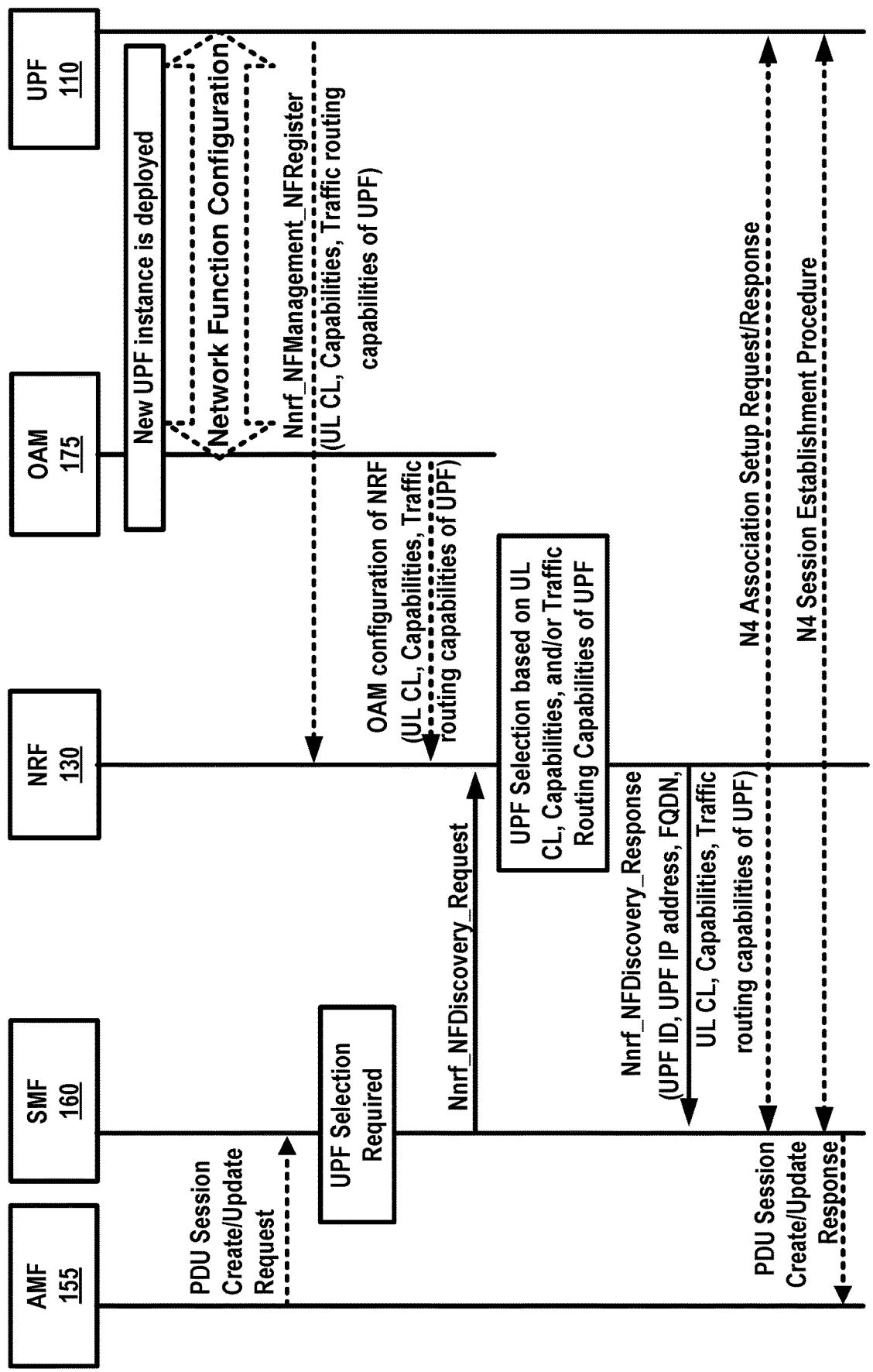
FIG. 13 is an example call flow as per an aspect of an embodiment of the present disclosure.

In an example FIG. 13, the NRF 130 may receive from a second network element, a sixth message. In an example, the second network element may be the OAM 175, the UPF 110, and/or the like. In an example, the sixth message may comprise the uplink classifier indication parameter for the network function. The network function may be the UPF 110, the second network element, and/or the like. In an example, the sixth message may further comprise the identifier of the network function, the capability information of the network function, the traffic routing capability of the network function, the network function type of the network function, the IP address of the network function, the fully qualified domain name (FQDN) of the network function, the profile of the network function, the list of supported S-NSSAIs, and/or the like. In an example, the profile of the network function may be employed to describe the characteristics of the NF instance. When one CN NF instance is instantiated, the associated NF profile may be generated and stored on the NF instance. During the service registration procedure, the NF profile may be registered and stored on the NRF 130. The profile of the network function may comprise at the NF Type, the FQDN and IP address of the NF instance, Network Slice related Identifier(s) e.g. S-NSSAI, NSI ID, NF capacity information, permissions, authorization information, and/or the like.

In an example embodiment, UPF 110 selection may be performed by the NRF 130 or assisted by the NRF 130. In an example, the SMF 160 may utilize the NRF 130 to discover the UPF instance(s); In that case, the SMF 160 may send a seventh message (e.g., a discovery request, an Nnrf_NFDiscovery_Request message, and/or the like). The seventh message may comprise one or more required capabilities. In an example, the one or more required capabilities may be the uplink classifier functionality, the traffic routing capability, the network function type of the network function, the list of supported S-NSSAIs, DNN, DNAI, connectivity requirements (e.g., N3 and/or intra PLMN N9, inter PLMN N9 and/or N6). In an example, upon receiving the seventh message, the NRF may select the UPF 110 based on the uplink classifier functionality and/or the one or more required capabilities. In an example, in response to receiving the seventh message (e.g., the discovery request message), the NRF 130 may send an eighth message to the SMF 160 in response to the discovery request message. The eighth message may comprise the identifier e.g., the FQDN, and/or the IP address of the network function (the selected UPF 110). In an example, the SMF 160 may provide the SMF 160 with information to assist UPF 110 selection (e.g., including UPF 110 location, the identifier of the UPF 110, UPF 110 capacity, and UPF 110 optional functionalities and capabilities, and/or the like). In an example embodiment, the eighth message may further comprise the uplink classifier indication parameter, the traffic routing capability, and/or the like.

In an example embodiment, the seventh message may be triggered by a ninth message wherein the SMF may receive the creation request of one or more PDU sessions for the wireless device, the UE 100 and determine that the one or more PDU sessions may require the uplink classifier functionality. The ninth message may be the creation request of one or more PDU sessions for the wireless device, the UE 100. In an example embodiment, the SMF 160 may receive from the AMF 155 the ninth message indicating the creation request of one or more PDU sessions for a wireless device, the UE 100. In an example, the ninth message may be the N11 message (e.g., the N11 message from the AMF 155 to the SMF 160 as part of the PDU session establishment procedure, the N11 message from the AMF 155 to the SMF 160 as part of the service request procedure, and/or the like) indicating the creation request of one or more PDU sessions (e.g., the session creation request, the session modification request message, and/or the like). The session creation request may be part of the service request procedure, the PDU session establishment, and/or the like of the wireless device, the UE 100. The session creation/modification request may comprise one or more of NSSAI, S-NSSAI (e.g., requested S-NSSAI, allowed S-NSSAI, subscribed S-NSSAI, and/or the like), DNN, PDU Session ID, Request type, Old PDU Session ID, N1 SM container (PDU Session Establishment Request), and/or the like. In an example embodiment, if the SMF 160 may determine that a new UPF 110 may be selected (e.g., based on the initial request indication, the indication for selecting the new intermediate UPF 110, and/or the like), the SMF 160 may select the new UPF 110 based on one or more of the following: the uplink classifier indication parameter, the traffic routing capability, UPF's dynamic load, UPF's relative static capacity among UPFs supporting the same DNN, UPF 110 location available at the SMF 160, UE 100 location information, Capability of the UPF 110 and the functionality required for the particular UE 100 session. In an example, the appropriate UPF 110 may be selected by matching the functionality and features required for the UE 100, Data Network Name (DNN), PDU Session Type (i.e. IPv4, IPv6, Ethernet Type or Unstructured Type) and if applicable, the static IP address/prefix, SSC mode selected for the PDU Session, UE 100 subscription profile in UDM 140, DNAI as included in the PCC Rules, Local operator policies, S-NSSAI, Access technology being used by the UE 100, UPF logical topology, and/or the like.

In an example, the SMF 160 may determine that the one or more PDU session may require the uplink classifier functionality. In an example, the SMF 160 may select the network function, the UPF 110, in response to the determining. The SMF may select the network function, the UPF 110, based on the uplink classifier indication parameter.

In an example embodiment, the SMF 160 may receive from the NRF 130, an eighth message. In an example, the eighth message may comprise the network function identifier and/or IP address of the UPF 110, and/or the like. In an example, the network function identifier may be a fully qualified domain name (FQDN) of the user plane function, the UPF 110. In an example the eighth message may be an Nnrf_NFDiscovery_Response message. The Nnrf_NFDiscovery_Response message may be part of an NRF service discovery service e.g., Nnrf_NFDiscovery service. The NRF service discovery service may enable the SMF to discover a set of network function, NF instances with specific NF service, or a target NF type (e.g., the user plane function, the UPF 110, and/or the like), or to discover a specific NF service. The Nnrf_NFDiscovery_Response message may comprise FQDN and/or IP address(es) for the target Service Name (e.g., the UPF 110). In an example, FQDN and IP addresses may belong to a set of requested target NF instance(s), or NF service instance(s).

In an example embodiment, the N4 Association Setup procedure may be employed to setup an N4 association between the SMF 160 and the UPF 110, to enable the SMF 160 to use the resources of the UPF 110 to establish N4 Sessions. The SMF 160 and the UPF 110 may exchange supported functionalities on each side during the N4 Association Setup procedure. The setup of the N4 association may be initiated by the SMF 160 upon receiving the eighth message. The SMF 160 may initiate the N4 Association Setup procedure to request to setup an N4 association towards the UPF 110 prior to establishing the first N4 session on the UPF 110. When receiving the N4 Association Setup Request from the SMF 160, the UPF 110 may send the N4 Association Setup Response. In an example, the N4 association setup request may comprise at least one or more of a unique identifier (e.g., IP address, FQDN, and/or the like) of the SMF 160, the recovery time stamp indicating when the SMF 160 was started, the SMF 160 supported features, and/or the like. In an example, the N4 association setup response may comprise at least one or more of a unique identifier (e.g., IP address, FQDN, and/or the like) of the UPF 110, the recovery time stamp indicating when the UPF 110 was started, the UPF 110 supported features, the UPF 110 IP resource information (e.g., IPv4, IPv6 address, range of TEID and/or the like), and/or the like.

In an example embodiment, the SMF 160 may send to the UPF 110 a tenth message indicating the PDU session creation request (e.g., an N4 session establishment/modification). The session establishment/modification may be part of the N4 session management procedure that may be employed to control the functionality of the UPF 110. The SMF 160 may create, update and/or remove the N4 session context in the UPF 110. The N4 session establishment procedure may be employed to create the initial N4 session context for the PDU Session at the UPF 110. The SMF 160 may assign a new N4 Session ID and may provide the new N4 Session ID to the UPF 110. The N4 Session ID may be stored by both entities (e.g., the SMF 160 and the UPF 110) and may be employed to identify the N4 session context during their interaction. The SMF 160 may store the relation between the N4 Session ID and PDU Session for the UE 100. The tenth message (e.g, the N4 session establishment request) may comprise Packet detection, Data forwarding, enforcement and reporting rules to be installed on the UPF 110. In an example, the UPF 110 may send the N4 Session Establishment Response message to the SMF 160. In case the UPF 110 may allocate CN Tunnel Info, the UPF 110 may provide DL CN Tunnel Info for the UPF 110 acting as PDU Session Anchor and UL CN Tunnel Info (i.e. CN N3 tunnel info) to the SMF 160.

In an example embodiment, the NRF 130 may receive from the SMF 160 the first message indicating the request of updated network function information. In an example, the NRF 130 may receive from the first network element, the second message comprising the uplink classifier indication parameter for the network function, the uplink classifier indication parameter indicating that the network function may support the uplink classifier functionality.

In an example embodiment, the NRF 130 may send to the SMF 160 the third message in response to receiving the second message. The third message may be based on the request of the first message. The third message may comprise the identifier of the network function, the uplink classifier indication parameter, and/or the like.

In an example embodiment, the SMF 160 may receive from the AMF 155, the fourth message indicating the creation request of one or more PDU sessions for the wireless device.

In an example, the SMF 160, may determine that the one or more PDU session requires the uplink classifier functionality.

In an example, in response to the determining, the SMF 160 may select the network function, the UPF 110, based on the uplink classifier indication parameter.

In an example, the SMF 160 may send to the network function, the UPF 110, the fifth message indicating the PDU session creation request.

In an example, the first network element may be the network function or the OAM 175.

In an example, the network function may be the UPF 110.

In an example embodiment, the second message may further comprise the identifier of the network function, the capability information of the network function, the traffic routing capability of the network function, the network function type of the network function, the IP address of the network function, the fully qualified domain name of the network function, the profile of the network function, the list of supported S-NSSAI, and/or the like.

In an example embodiment, the third message may further comprise the capability information of the network function, the traffic routing capability of the network function, the network function type of the network function, the IP address of the network function, the fully qualified domain name of the network function, the profile of the network function, the list of supported S-NSSAI, and/or the like.

In an example embodiment, the capability information may be at least one or more of the UPF 110 relative capacity, the UPF 110 dynamic load, and/or the like.

In an example embodiment, the traffic routing capability may indicate that the network function, the UPF 110, may support the IPv6 multi-homing functionality.

In an example embodiment, the NRF 130 may receive from the second network element, the sixth message comprising the uplink classifier indication parameter for the network function. The uplink classifier indication parameter may indicate that the network function may support the uplink classifier functionality.

In an example, the NRF 130 may receive from the SMF 160, the seventh message indicating that discovery of the network function is needed. In an example, the seventh message may comprise one or more required capabilities of the network function.

In an example, the NRF 130 may select the network function based on the one or more required capabilities and the uplink classifier indication parameter.

In an example, the NRF 130 may send to the SMF 160, the eighth message comprising the identifier and/or the IP address of the network function.

In an example, the eighth message may further comprise the uplink classifier indication parameter.

In an example, the SMF 160 may receive from the AMF 155, the ninth message indicating the creation request of one or more PDU sessions for the wireless device.

In an example, the SMF 160 may determine that the one or more PDU sessions may require the uplink classifier functionality.

In an example, the SMF 160 may send to the NRF 130, the seventh message in response to the determining that one or more PDU sessions may require the uplink classifier functionality.

In an example, the SMF may send to the network function based on the identifier and/or the IP address of the network function, the tenth message indicating the PDU session creation request.

In an example, the second network element may be the network function or the OAM 175.

In an example, the network function may be the UPF 110.

In an example, the sixth message may further comprise at least one or more of: the identifier of the network function, the capability information of the network function, the traffic routing capability of the network function, the network function type of the network function, the IP address of the network function, the fully qualified domain name of the network function, the profile of the network function, the list of supported S-NSSAIs, and/or the like.

In an example, the one or more required capabilities may comprise at least one or more of: the uplink classifier functionality, the traffic routing capability, the network function type of the network function, the list of supported S-NSSAIs, and/or the like.

In an example, the capability information may comprise at least one of: the UPF relative static capacity, the UPF dynamic load, and/or the like.

In an example, the traffic routing capability may indicate that the network function may supports the IPv6 multi-homing functionality.

Figure 14:
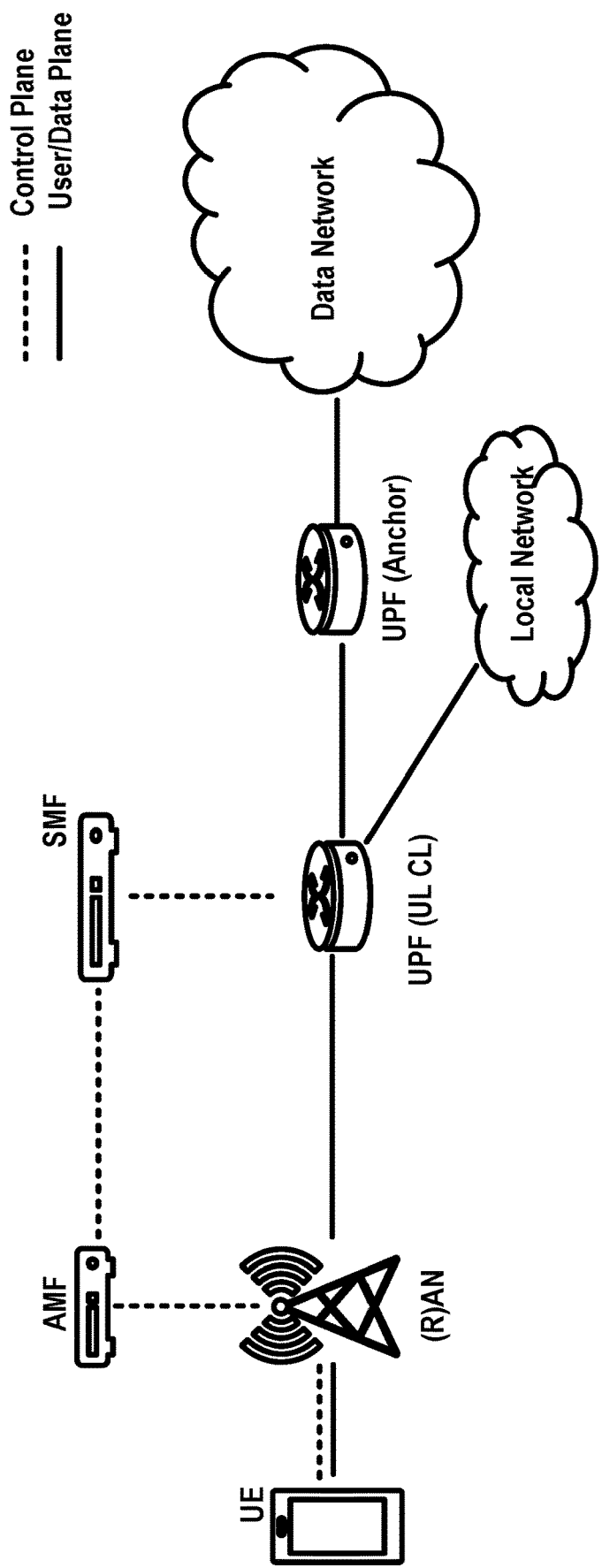
FIG. 14 is an example illustration as per an aspect of an embodiment. of the present disclosure.
Figure 15:
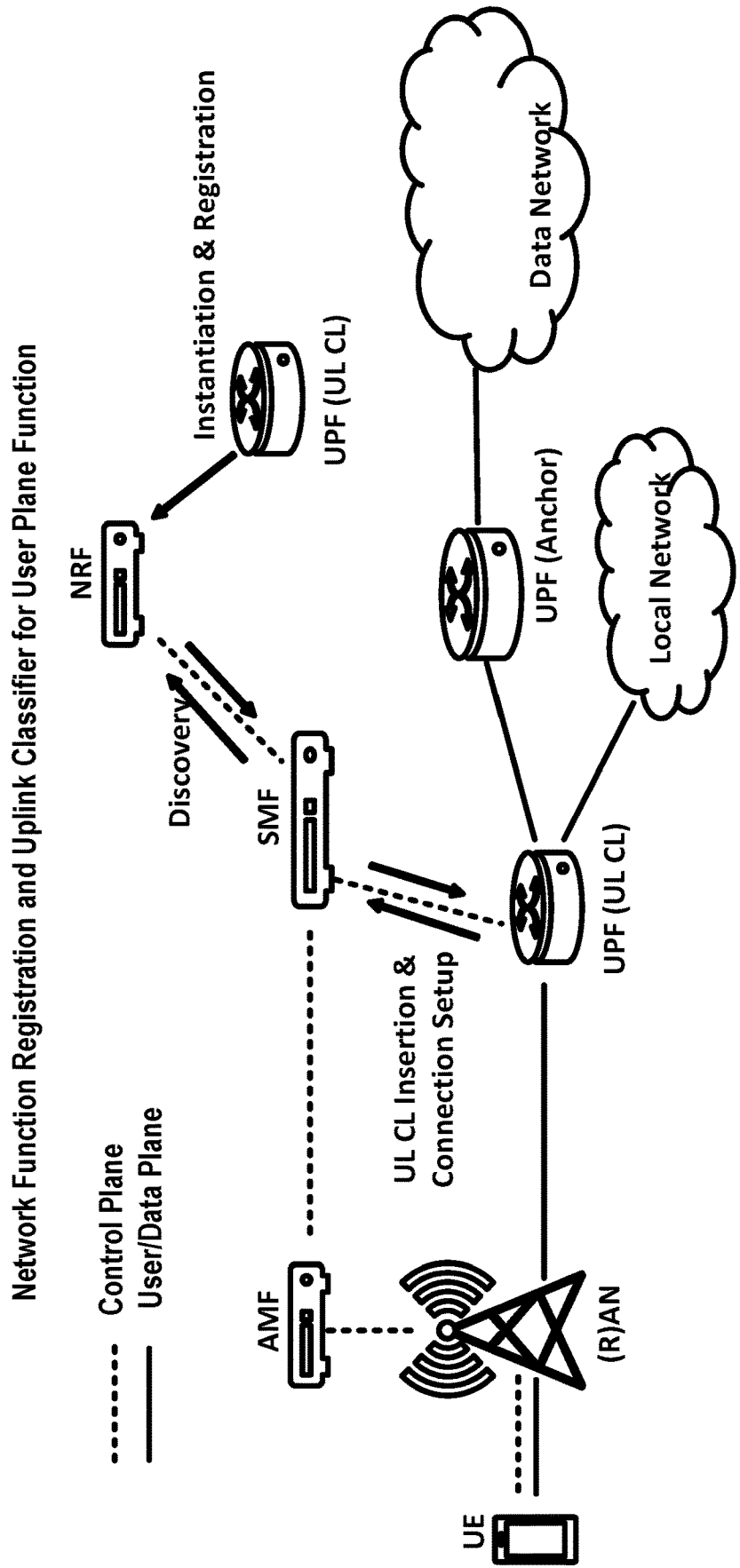
FIG. 15 is an example illustration as per an aspect of an embodiment of the present disclosure.

Example FIG. 14 and FIG. 15 illustrate a 5G core network and steps for inserting a UPF with UL CL functionality. In example FIG. 15, a UPF registers with an NRF or OAM.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

FIG. 16 is a flow diagram of an aspect of an embodiment of the present disclosure. At 1610, a session management function may receive a request from an access and mobility management function. The request may be for a packet data unit session for a wireless device. At 1620, the session management function may determine that the packet data unit session for the wireless device requires a user plane function that supports an uplink classifier functionality. At 1630, the session management function may send a first message to a network repository function based on the determining. The first message may request a discovery of the user plane function. The first message may comprise an uplink classifier indication parameter. At 1640, the session management function receive a second message from the network repository function based on the first message. The second message may comprise an identifier of the user plane function. At 1650, the session management function may send a third message to the user plane function. The third message may request establish a connection between the session management function and the user plane function.

According to an example embodiment, the third message may comprise an identifier of the connection between the session management function and the user plane function. According to an example embodiment, the request for the packet data unit session for the wireless device may comprise a request to create the packet data unit session for the wireless device. According to an example embodiment, the request to create the packet data unit session may comprise an identifier of the packet data unit session. According to an example embodiment, the request to create the packet data unit session may comprise network slice information of the packet data unit session. According to an example embodiment, the request to create the packet data unit session may comprise the session management function may send to the access and mobility management function, a response message indicating a result of the request to create the packet data unit session. According to an example embodiment, the request to create the packet data unit session may be in response to a session creation request by the wireless device.

According to an example embodiment, the session management function may receive from the user plane function, a response message indicating a result of the third message. According to an example embodiment, the network repository function may select the user plane function based on the uplink classifier indication parameter.

According to an example embodiment, the request for the packet data unit session for the wireless device may comprise a request to modify the packet data unit session for the wireless device. According to an example embodiment, the request to modify the packet data unit session may be in response to a session modification request by the wireless device. According to an example embodiment, the session management function may send to the access and mobility management function, a response message indicating a result of the request to modify the packet data unit session.

According to an example embodiment, the second message may further comprises at least one capability information of the user plane function. According to an example embodiment, the at least one capability information of the user plane function may comprise a traffic routing capability of the user plane function. According to an example embodiment, the traffic routing capability may indicate that the user plane function supports an ipv6 multi-homing functionality.

According to an example embodiment, the second message may comprise an identifier of the user plane function. According to an example embodiment, the second message may comprise an IP address of the user plane function. According to an example embodiment, the second message may comprise a fully qualified domain name of the user plane function. According to an example embodiment, the second message may comprise a profile of the user plane function.

According to an example embodiment, the session management function may send a session association setup request to the user plane function. According to an example embodiment, the session association setup request may comprises an N4 session association setup request. According to an example embodiment, the session management function may receive a session association setup response from the user plane function. According to an example embodiment, the session association setup request may comprise an address of the user plane function. According to an example embodiment, the session association setup request may comprise a fully qualified domain name of the user plane function.

According to an example embodiment, the uplink classifier functionality may comprise at least one packet filtering rule. According to an example embodiment, the uplink classifier functionality may comprise at least one traffic detection rule. According to an example embodiment, the uplink classifier functionality may comprise at least one traffic forwarding rule. According to an example embodiment, the connection between the session management function and/or the user plane function may comprise an N4 session.

FIG. 17 is a flow diagram of an aspect of an embodiment of the present disclosure. At 1710, a network repository function may receive a first message from a user plane function. The first message may indicate a registration request for the user plane function. The first message may comprise an uplink classifier parameter indicating that the user plane function supports an uplink classifier functionality. At 1720, the network repository function may receive a second message from a session management function. The a second message may indicate a request to discover a user plane function that supports the uplink classifier functionality. At 1730, the network repository function may select, in response to receiving the second message, the user plane function based on the uplink classifier parameter. At 1740, the network repository function may send a third message to the session management function. The third message may comprise an identifier of the user plane function.

FIG. 18 is a flow diagram of an aspect of an embodiment of the present disclosure. At 1810, a session management function may determine that a packet data unit session of a wireless device requires a user plane function that supports an uplink classifier functionality. At 1820, the session management function may send a first message to a network repository function based on the determining. The first message may request a discovery of the user plane function supporting the uplink classifier functionality. At 1830, the session management function may receive a second message from the network repository function based on the first message. The second message may comprise an identifier of the user plane function. At 1840, the session management function may send a third message to the user plane function. The third message may request establishment of a connection between the session management function and the user plane function.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to."

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   sending, by a session management function to a network repository function, a first message requesting discovery of a user plane function supporting an uplink classifier functionality for a packet data unit session of a wireless device, the first message comprising an uplink classifier indication parameter;
   receiving, by the session management function from the network repository function and based on the first message, a second message comprising an identifier of the user plane function; and
   sending, by the session management function to the user plane function, a third message requesting a connection for the wireless device, between the session management function and the user plane function.

2. The method of claim 1, wherein the third message comprises an identifier of the connection between the session management function and the user plane function.

3. The method of claim 1, further comprising:
receiving, by the session management function from an access and mobility management function, a request for the packet data unit session for a wireless device; and
determining, by the session management function, that the packet data unit session for the wireless device requires the user plane function that supports the uplink classifier functionality.

4. The method of claim 3, wherein the request for the packet data unit session for the wireless device comprises a request to create the packet data unit session for the wireless device.

5. The method of claim 4, wherein the request to create the packet data unit session comprises:
an identifier of the packet data unit session; and
network slice information of the packet data unit session.

6. The method of claim 4, further comprising sending, by the session management function to the access and mobility management function, a response message indicating a result of the request to create the packet data unit session.

7. The method of claim 4, wherein the request to create the packet data unit session is in response to a session creation request by the wireless device.

8. The method of claim 3, wherein the request for the packet data unit session for the wireless device comprises a request to modify the packet data unit session for the wireless device.

9. The method of claim 8, wherein the request to modify the packet data unit session is in response to a session modification request by the wireless device.

10. The method of claim 8, further comprising sending, by the session management function to the access and mobility management function, a response message indicating a result of the request to modify the packet data unit session.

11. An apparatus comprising:
one or more processors; and
memory storing instructions that, when executed by the one or more processors, cause a session management function to:
send, to a network repository function, a first message requesting discovery of a user plane function supporting an uplink classifier functionality for a packet data unit session of a wireless device, the first message comprising an uplink classifier indication parameter;
receive, from the network repository function and based on the first message, a second message comprising an identifier of the user plane function; and
send, to the user plane function, a third message requesting a connection for the wireless device, between the session management function and the user plane function.

12. The apparatus of claim 11, wherein the third message comprises an identifier of the connection between the session management function and the user plane function.

13. The apparatus of claim 11, wherein the instructions, when executed by the one or more processors, further cause the session management function to:
receive, from an access and mobility management function, a request for the packet data unit session for a wireless device; and
determine, that the packet data unit session for the wireless device requires the user plane function that supports the uplink classifier functionality.

14. The apparatus of claim 13, wherein the request for the packet data unit session for the wireless device comprises a request to create the packet data unit session for the wireless device.

15. The apparatus of claim 14, wherein the request to create the packet data unit session comprises:
an identifier of the packet data unit session; and
network slice information of the packet data unit session.

16. The apparatus of claim 14, wherein the instructions, when executed by the one or more processors, further cause the session management function to send, to the access and mobility management function, a response message indicating a result of the request to create the packet data unit session.

17. The apparatus of claim 14, wherein the request to create the packet data unit session is in response to a session creation request by the wireless device.

18. The apparatus of claim 13, wherein the request for the packet data unit session for the wireless device comprises a request to modify the packet data unit session for the wireless device.

19. The apparatus of claim 18, wherein the request to modify the packet data unit session is in response to a session modification request by the wireless device.

20. A system comprising:
a network repository function;
user plane function; and
a session management function comprising:
one or more processors; and
memory storing instructions that, when executed by the one or more processors, cause a session management function to:
send, to the network repository function, a first message requesting discovery of the user plane function supporting an uplink classifier functionality for a packet data unit session of a wireless device, the first message comprising an uplink classifier indication parameter;
receive, from the network repository function and based on the first message, a second message comprising an identifier of the user plane function; and
send, to the user plane function, a third message requesting a connection for the wireless device, between the session management function and the user plane function.

* * * * *